US012508700B2

(12) United States Patent
Nishikawa et al.

(10) Patent No.: US 12,508,700 B2
(45) Date of Patent: Dec. 30, 2025

(54) POWER TOOL HAVING A HAMMER MECHANISM

(71) Applicant: MAKITA CORPORATION, Anjo (JP)

(72) Inventors: Takahiro Nishikawa, Anjo (JP); Yoshiro Tada, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/013,321

(22) Filed: Jan. 8, 2025

(65) Prior Publication Data

US 2025/0236003 A1 Jul. 24, 2025

(30) Foreign Application Priority Data

Jan. 19, 2024 (JP) ................................ 2024-007071

(51) Int. Cl.

*B25D 17/00* (2006.01)
*B25D 17/04* (2006.01)
*B25D 16/00* (2006.01)

(52) U.S. Cl.

CPC .......... *B25D 17/043* (2013.01); *B25D 16/006* (2013.01); *B25D 2217/0073* (2013.01); *B25D 2250/121* (2013.01)

(58) Field of Classification Search

CPC ........... B25D 17/043; B25D 2250/121; B25D 16/006; B25D 2217/0073; B25D 17/24; B25D 11/003; B25D 16/0084; B25D 2216/0023; B25D 16/00

USPC .......................... 173/114, 162.2, 104, 162.1

See application file for complete search history.

(56) References Cited

U.S. PATENT DOCUMENTS

| | | | | |
|---|---|---|---|---|
| 2015/0144366 | A1* | 5/2015 | Machida ............... | B25D 16/00 173/104 |
| 2015/0202762 | A1* | 7/2015 | Roberts ............... | B25D 17/043 173/162.2 |
| 2015/0328760 | A1* | 11/2015 | Ikuta ................... | B25D 17/043 173/117 |
| 2016/0136801 | A1 | 5/2016 | Furusawa et al. | |
| 2021/0331304 | A1* | 10/2021 | Machida ............... | B25D 17/24 |
| 2022/0055198 | A1 | 2/2022 | Yoshikane et al. | |
| 2022/0266433 | A1 | 8/2022 | Machida et al. | |
| 2022/0266435 | A1* | 8/2022 | Machida ............... | B25D 16/00 |

FOREIGN PATENT DOCUMENTS

| | | |
|---|---|---|
| JP | 2022-036606 A | 3/2022 |
| JP | 2022-128006 A | 9/2022 |

* cited by examiner

*Primary Examiner* — Jacob A Smith

(74) *Attorney, Agent, or Firm* — Oliff PLC

(57) ABSTRACT

A power tool having a hammer mechanism includes a final output shaft configured to removably hold a tool accessory and defining a driving axis of the tool accessory, a housing, and a handle movable relative to the housing in an axial direction of the driving axis. The housing and the handle at least partially have such a shape that a radial distance between the housing and the handle is shorter when the handle is located at a first relative position maximally separated from the housing in the axial direction than when the handle is located at a second relative position close to the housing in the axial direction.

16 Claims, 13 Drawing Sheets

POWER TOOL HAVING A HAMMER MECHANISM

TECHNICAL FIELD

The present invention relates to a power tool having a hammer mechanism and configured to linearly drive a tool accessory.

BACKGROUND

Rotary hammers are configured to perform a hammering operation of linearly driving a tool accessory mounted in a tool holder along a driving axis and a drilling operation of rotationally driving the tool accessory around the driving axis. Generally, a motion conversion mechanism that converts a rotational motion of an intermediate shaft into a linear motion is employed for the hammering operation, and a rotation transmission mechanism that transmits a rotation to the tool holder via the intermediate shaft is employed for the drilling operation. This type of rotary hammer is subjected to a reaction force from a workpiece against a hammering force of the tool accessory when performing the hammering operation. This reaction force causes a vibration mainly in a direction in which the driving axis extends (hereinafter also referred to as an axial direction). This vibration is transmitted to a housing of the rotary hammer and thus to a user.

Japanese Patent Application Laid-Open Nos. 2022-36606 and 2022-128006 each disclose a rotary hammer having a structure for absorbing such a vibration in the axial direction. More specifically, a handle of the rotary hammer is configured to be slidable in the axial direction on guides disposed on a motor housing containing a motor. The handle is biased by biasing members away from the motor housing in the axial direction. When the tool accessory is subjected to the reaction force according to the hammering operation, this reaction force causes portions other than the handle to move rearward relative to the handle against the biasing forces of the biasing members together with the tool accessory. At this time, the biasing members are elastically deformed, and the reaction force is partially damped. This damping effect leads to a reduction in the axial vibration transmitted to the handle due to the reaction force.

The rotary hammer is also subjected to a vibration in a direction intersecting with the axial direction due to the driving of the motion conversion mechanism and the motor. The transmission of such a vibration to the handle is reduced due to radial rattling between the handle and the motor housing, provided that a clearance is secured between the handle and the motor housing. Especially, the rotary hammer disclosed in Japanese Patent Application Laid-Open No. 2022-128006 includes elastic members disposed between the handle and the motor housing, and therefore can effectively reduce the transmission of the vibration in the direction intersecting with the axial direction to the handle.

SUMMARY

The present specification discloses a power tool having a hammer mechanism. This power tool may include a final output shaft configured to removably hold a tool accessory and defining a driving axis of the tool accessory, a motor, a driving mechanism configured to perform at least a hammering operation of linearly driving the tool accessory along the driving axis using power of the motor, a housing, a handle configured to be movable relative to the housing in an axial direction of the driving axis, a biasing member configured to bias the handle away from the final output shaft in the axial direction, and at least one guide member disposed between the housing and the handle so as to extend in the axial direction and configured to slidably guide the relative movement between the handle and the housing. The housing and the handle may at least partially have such a shape that a radial distance between the housing and the handle is shorter when the handle is located at a first relative position maximally separated from the housing in the axial direction than when the handle is located at a second relative position close to the housing in the axial direction.

According to this power tool having a hammer mechanism, in a state that the power tool (more specifically, the tool accessory held by the final output shaft) is not pressed against the workpiece, the handle is located at the first relative position and therefore the radial distance between the housing and the handle (i.e., the clearance) is relatively shortened. Therefore, when the user holds the power tool in his/her hand in this state, the radial rattling between the handle and the housing is relatively reduced, and the feeling of use of the power tool is improved. On the other hand, when the power tool is pressed against the workpiece to machine the workpiece, the handle is located at the second relative position and therefore the radial distance between the housing and the handle is relatively increased. Therefore, the transmission of the vibration in the direction intersecting with the axial direction to the handle can be reduced.

DETAILED DESCRIPTION OF THE EMBODIMENTS

Figure 1:
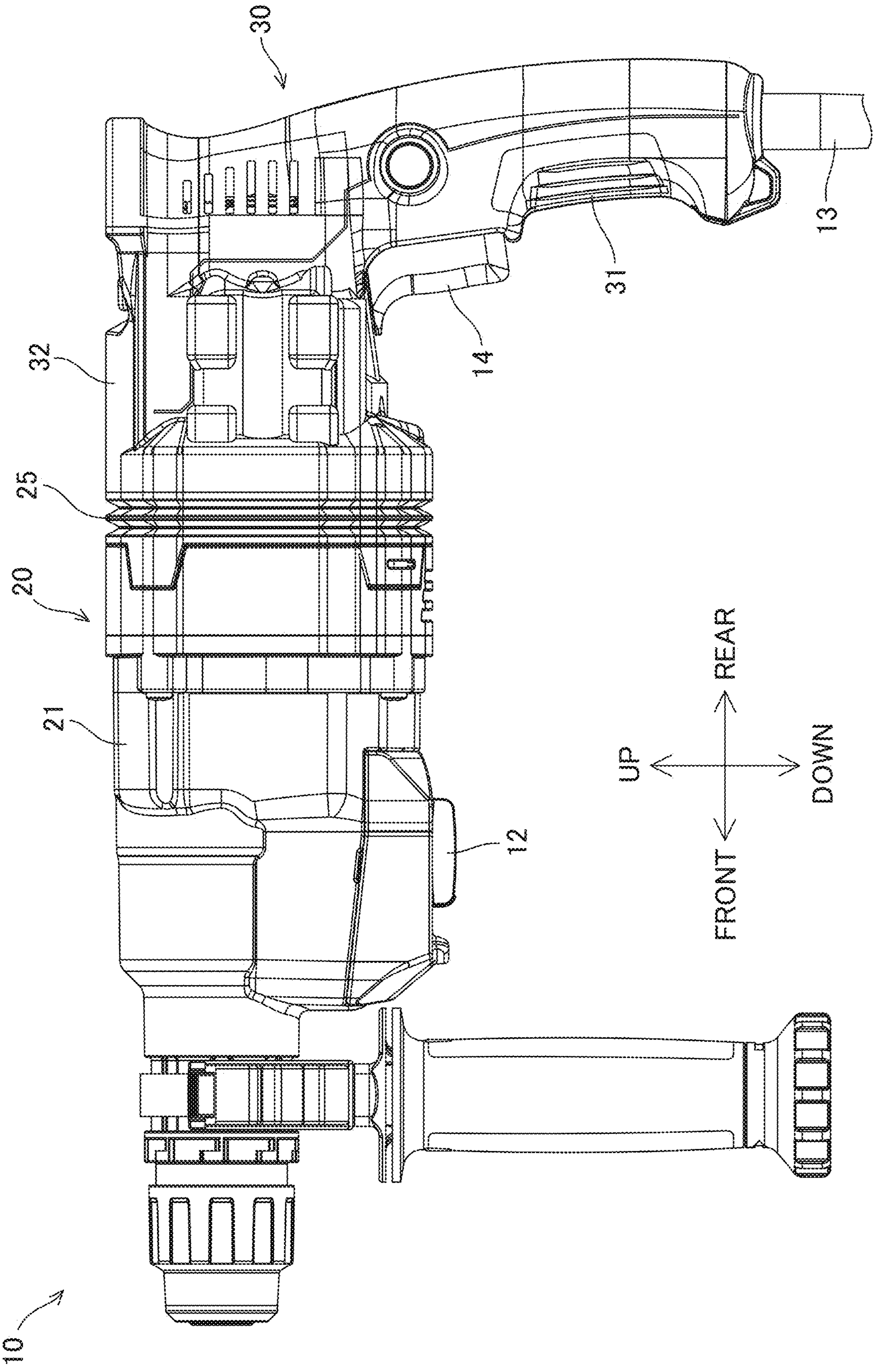
FIG. 1 is a side view of a rotary hammer according to one embodiment with a handle located at an initial position relative to a main body housing.

Representative and non-limiting specific examples of the present invention will be described in detail below with reference to the drawings. This detailed description is merely intended to teach a person of skill in the art details for practicing preferred examples of the present invention and is not intended to limit the scope of the present invention. Furthermore, each of additional features and inventions disclosed below can be utilized separately from or together with the other features and inventions to provide further improved apparatuses and methods for manufacturing and using the same.

Moreover, combinations of features and steps disclosed in the following detailed description are not necessary to practice the present invention in the broadest sense, and are instead taught merely to particularly describe a representative specific example of the present invention. Furthermore, various features of the above-described and the following representative examples, as well as various features recited in the independent and dependent claims below, do not necessarily have to be combined in herein specifically exemplified manners or enumerated orders to provide additional and useful embodiments of the present invention.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges and indications of groups or aggregations are intended to disclose every possible intermediate individual forming them for the purpose of original written disclosure, as well as for the purpose of restricting the claimed subject matter.

In one or more embodiments, the motor may have a rotational axis extending in parallel to the driving axis. The housing may contain the motor. The handle may be disposed outside the housing in a radial direction with respect to the rotational axis, and may include a first portion extending in the axial direction of the rotational axis and a second portion extending in a direction intersecting with the first portion so as to allow a user to grip the second portion. The at least one guide member may be disposed between the housing and the first portion. According to the power tool configured in this manner, the radial rattling between the handle and the housing is relatively reduced when the handle is located at the first relative position, and the feeling of use of the power tool is improved. Further, when the handle is located at the second relative position, the radial distance between the housing and the handle is relatively increased, and the transmission of the vibration in the direction intersecting with the axial direction to the handle can be reduced.

In one or more embodiments, the power tool may include at least one elastic member disposed adjacent to the at least one guide member and between the at least one guide member and the housing or between the at least one guide member and the handle. According to this configuration, when the vibration in the direction intersecting with the axial direction occurs with the power tool in use, the at least one elastic member is elastically deformed in the direction intersecting with the axial direction and absorbs this vibration. Therefore, the transmission of the vibration in the direction intersecting with the axial direction to the handle can be efficiently reduced.

In one or more embodiments, the housing may include at least one first abutment portion. The handle may include at least one second abutment portion which is in abutment with the at least one first abutment portion in such a manner that a clearance in the radial direction is zero (i.e., the radial relative displacement is prohibited) when the handle is located at the first relative position, and is out of abutment with the first abutment portion when the handle is located at the second relative position. According to this configuration, in the state that the power tool is not pressed against the workpiece, the handle is located at the first relative position, and the at least one first abutment portion of the housing and the at least one second abutment portion of the handle are in abutment with each other in such a manner that the radial clearance therebetween becomes zero. Therefore, in the state that the power tool is not pressed against the workpiece, the radial rattling between the handle and the motor housing can be further reduced, and the feeling of use of the power tool is further improved.

In one or more embodiments, the at least one first abutment portion may include at least one first tapered surface that extends to be located at a further inner position in the radial direction toward the final output shaft. The at least one second abutment portion may include at least one second tapered surface that extends to be located at a further inner position in the radial direction toward the final output shaft, and is planarly contactable with the at least one first tapered surface. According to this configuration, compared to such a configuration that the at least one first abutment portion and the at least one second abutment portion are each a surface that faces the radial direction (i.e., a surface parallel to the axial direction), the at least one first abutment portion and the at least one second abutment portion are immediately separated from each other, generating a clearance allowing the handle and the housing to radially move relative to each other (i.e., a clearance contributive to reducing the transmission of the vibration in the direction intersecting with the axial direction to the handle) when the handle starts moving relative to the housing from the first relative position toward the second relative position (i.e., when the user starts pressing the power tool against the workpiece to machine the workpiece). Therefore, the vibration-isolating performance can be improved. In addition, the at least one first abutment portion and the at least one second abutment portion can function as a guide when the handle returns from the second relative position to the first relative position.

In one or more embodiments, the at least one first abutment portion may include at least one first front-side abutment portion, and at least one first rear-side abutment portion spaced apart from the at least first front-side abutment portion in the axial direction and disposed at a position farther away from the final output shaft than the at least one first front-side abutment portion. The at least one second abutment portion may include at least one second front-side abutment portion configured to be in abutment with the at least one first front-side abutment portion, and at least one second rear-side abutment portion spaced apart from the at least one second front-side abutment portion in the axial direction and configured to be in abutment with the first rear-side abutment portion. According to this configuration, the at least one first abutment portion and the at least one second abutment potion are in abutment with each other on at least two positions spaced apart from each other in the axial direction, and therefore the radial rattling between the handle and the housing can be further stably reduced in the state that the power tool is not pressed against the workpiece (i.e., when the handle is located at the first relative position).

In one or more embodiments, the at least one first abutment portion may include at least three first abutment portions circumferentially spaced apart from each other. According to this configuration, the at least one first abutment portion and the at least one second abutment potion are in abutment with each other on at least three positions circumferentially spaced apart from each other, and therefore the radial rattling between the handle and the housing can be further stably reduced.

In one or more embodiments, when a front-rear direction is defined to be a direction in which the driving axis extends, an up-down direction is defined to be a direction orthogonal to the front-rear direction and generally coinciding with a direction in which the second portion of the handle extends, and a left-right direction is defined to be a direction orthogonal to the front-rear direction and the up-down direction, the at least one guide member and the at least one first abutment portion may include four sets of guide members and first abutment portions respectively disposed in four quadrants defined based on the up-down direction and the left-right direction with an origin placed at the rotational axis. According to this configuration, in the state that the power tool is not pressed against the workpiece (i.e., when the handle is located at the first relative position), the at least one first abutment portion and the at least one second abutment portion are respectively in abutment with each other at four positions distributed in a well-balanced manner to the four quadrants. Therefore, the radial rattling between the handle and the housing can be further reduced, and the feeling of use of the power tool is further improved. In addition, the guide member is respectively disposed at each of the four positions arranged in a well-balanced manner to the four quadrants, and therefore the handle can smoothly slidably move relative to the housing in the axial direction. In other words, a wobbling of the axial relative movement between the handle and the housing in the direction intersecting with the axial direction can be reduced.

In one or more embodiments, the four sets of the guide members and the first abutment portions may be arranged in such a manner that a circumferential distance between the guide member and the first abutment portion adjacent to each other is shorter than a circumferential distance between the two guide members adjacent to each other. According to this configuration, the circumferential distance between the guide member and the first abutment portion is relatively shortened, and therefore the radial rattling between the handle and the housing can be further reduced when the handle is separated from the first relative position, and the feeling of use of the power tool is further improved.

In one or more embodiments, a separation distance between the at least one second front-side abutment portion and the at least one second rear-side abutment portion may be equal to or longer than one-third of a distance by which the guide member extends in a longitudinal direction of the guide member. According to this configuration, the separation distance between the at least one second front-side abutment portion and the at least one second rear-side abutment portion in the axial direction can be relatively increased. Therefore, the radial rattling between the handle and the housing can be further stably reduced in the state that the power tool is not pressed against the workpiece (i.e., when the handle is located at the first relative position).

In one or more embodiments, the housing may include at least one rear-side stopper portion continuous to an edge portion of the at least one first tapered surface of the at least one first rear-side abutment portion on an opposite side from the final output shaft. The at least one rear-side stopper portion may be configured to contact the handle to restrict a relative displacement between the handle and the housing in the radial direction when the handle is located at the second relative position and the handle is displaced relative to the housing in the radial direction by a predetermined amount. According to this configuration, when the handle is displaced relative to the housing by the predetermined amount in the radial direction while the power tool is pressed against the workpiece to machine the workpiece (i.e., while the handle is located at the second relative position), a further displacement is prevented by the at least one rear-side stopper portion. Further, the first rear-side abutment portion and the at least one rear-side stopper portion can be integrally structured, and therefore the structure of the housing can be simplified.

In one or more embodiments, the housing may include at least one front-side stopper portion continuous to an edge portion of the at least one first tapered surface of the at least one first front-side abutment portion on a closer side to the final output shaft. The at least one front-side stopper portion may be configured to contact the handle to restrict a relative displacement between the handle and the housing in the radial direction when the handle is located at the second relative position and the handle is displaced relative to the housing in the radial direction by a predetermined amount. According to this configuration, when the handle is displaced relative to the housing by the predetermined amount in the radial direction while the power tool is pressed against the workpiece to machine the workpiece (i.e., while the handle is located at the second relative position), a further displacement is prevented by the at least one front-side stopper portion. Further, the first front-side abutment portion and the at least one front-side stopper portion can be integrally structured, and therefore the structure of the housing can be simplified.

In the following description, a rotary hammer 10 as one example of a power tool having a hammer mechanism according to one exemplary embodiment will be described in further detail with reference to the drawings. In the present embodiment, the rotary hammer 10 will be cited as one example of a power tool having a hammer mechanism. The rotary hammer 10 is a handheld-type power tool used for machining work such as chipping work and drilling work, and is configured to perform an operation of linearly driving a tool accessory 11 (refer to FIG. 3) along a predetermined driving axis AX1 (hereinafter referred to as a hammering operation) and an operation of rotationally driving the tool accessory 11 around the driving axis AX1 (hereinafter referred to as a drilling operation).

Figure 3:
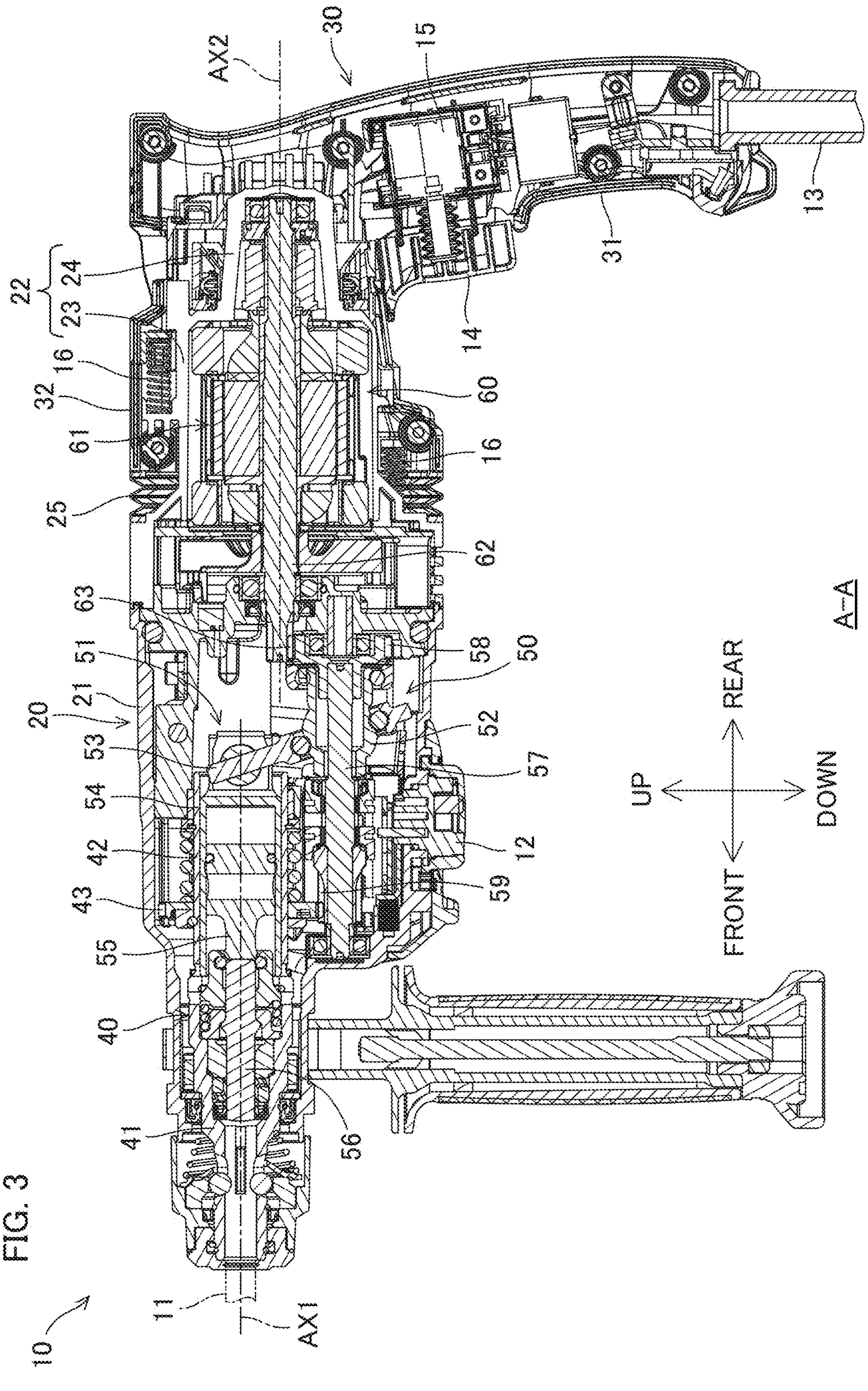
FIG. 3 is a vertical cross-sectional view of the rotary hammer taken along a line A-A illustrated in FIG. 2 with the handle located at the initial position relative to the main body housing.

First, the overall configuration of the rotary hammer 10 will be briefly described mainly with reference to FIGS. 1 and 3. As illustrated in FIG. 1, the outer housing of the rotary hammer 10 mainly includes a main body housing 20 and a handle 30 coupled with the main body housing 20.

The main body housing 20 is a hollow member that contains a spindle 40, a driving mechanism 50, a motor 60, and the like. The spindle 40 is an elongated hollow cylindrical member, and includes a tool holder 41 at its one axial end portion. The tool holder 41 removably holds the tool accessory 11. The longitudinal axis of the spindle 40 defines the driving axis AX1 of the tool accessory 11. The main body housing 20 extends along the driving axis AX1. The tool holder 41 is disposed in one end portion of the main body housing 20 in an extension direction of the driving axis AX1 (hereinafter also simply referred to as an axial direction).

The handle 30 is disposed on one side of the main body housing 20 in the axial direction (the opposite side from where the spindle 40 is disposed). The handle 30 includes a grip portion 31 extending in a direction intersecting with the driving axis AX1 (more specifically, a direction generally orthogonal to the driving axis AX1). The grip portion 31 is a portion intended to be gripped by a user, and is formed so as to protrude in the direction intersecting with the driving axis AX1.

As will be used in the following description, a front-rear direction of the rotary hammer 10 is defined to be the extension direction of the driving axis AX1 (the direction along the longitudinal axis of the main body housing 20) for the sake of convenience. A front side and a rear side of the rotary hammer 10 are defined to be one side in the front-rear direction where the spindle 40 is located and the opposite side (where the motor 60 is located), respectively. Further, an up-down direction of the rotary hammer 10 is defined to be a direction orthogonal to the driving axis AX1 and generally coinciding with the direction in which the grip portion 31 extends. An upper side and a lower side of the rotary hammer 10 are defined to be one side in the up-down direction where the main body housing 20 is located and the opposite side where the protrusion end of the grip portion 31 is located, respectively. Further, a left-right direction of the rotary hammer 10 is defined to be a direction orthogonal to the front-rear direction and the up-down direction. A right side and a left side of the rotary hammer 10 are defined to be the right side and the opposite side therefrom in the left-right direction when the front side is viewed from the rear side, respectively.

Now, the detailed configuration of the rotary hammer 10 will be described. As illustrated in FIG. 3, the main body housing 20 includes a gear housing 21 and a motor housing 22. The spindle 40 and the driving mechanism 50 are contained in the gear housing 21.

The motor 60 is contained in the motor housing 22. The motor housing 22 is disposed in the rear of the gear housing 21 adjacently to the gear housing 21. The motor housing 22 is a single member, and includes a tubular portion 23 and a bearing holding portion 24.

The tubular portion 23 is a tubular portion extending in the axial direction. More specifically, the tubular portion 23 includes a front end portion and a rear portion located in the rear of the front end portion. The front end portion of the tubular portion 23 has a circumferential length (i.e., a dimension around the driving axis AX1) approximately equal to the rear end portion of the gear housing 21. The rear portion has an outer diameter smaller than the front end portion of the tubular portion 23. The bearing holding portion 24 protrudes rearward from the rear end surface of the tubular portion 23, and has an outer diameter smaller than the outer diameter of the rear half of the tubular portion 23.

As illustrated in FIG. 3, the motor 60 includes a motor main body portion 61 having a stator and a rotor, and a motor shaft 62 configured to be rotatable integrally with the rotor. The motor main body portion 61 is contained in the tubular portion 23 (more specifically, the rear portion of the tubular portion 23). A rotational axis AX2 of the motor 60 (the motor shaft 62) is located below the driving axis, and extends in parallel to the driving axis AX1. The motor shaft 62 is supported, by via two bearings, rotatably around the rotational axis AX2. The front end portion of the motor shaft 62 extends to an inside of the gear housing 21. A pinion gear 63 is formed on this portion protruding to the inside of the gear housing 21.

The spindle 40 is a final output shaft of the rotary hammer 10. As illustrated in FIG. 3, the spindle 40 is disposed in the gear housing 21 along the driving axis AX1, and is supported, two bearings, rotatably around the driving axis AX1 relative to the main body housing 20. The spindle 40 is configured as an elongated stepped circular hollow cylindrical member.

The front half portion of the spindle 40 constitutes the tool holder 41, in which the tool accessory 11 is removably mountable. The tool accessory 11 is inserted in the front end portion of the tool holder 41 in such a manner that the longitudinal axis of the tool accessory 11 coincides with the driving axis AX1. The tool accessory 11 is held by the tool holder 41 in a state of being permitted to axially move relative to the tool holder 41 and restricted from rotating around the axis. The rear half portion of the spindle 40 constitutes a cylinder 42 slidably holding a piston 54, which will be described below.

The driving mechanism 50 is configured to perform the hammering operation of linearly driving the tool accessory 11 along the driving axis AX1 and the drilling operation of rotationally driving the tool accessory 11 around the driving axis AX1 using power of the motor 60.

More specifically, the driving mechanism 50 includes a hammer mechanism 51 for the hammering operation. The hammer mechanism 51 includes a motion conversion member 52, an arm portion 53, the piston 54, a striker 55, and an impact bolt 56. The motion conversion member 52 is disposed around an intermediate shaft 57. The intermediate shaft 57 extends in parallel to the rotational axis AX2 of the motor shaft 62. The intermediate shaft 57 is rotatably supported by two bearings. A rotational force of the motor shaft 62 is transmitted to the intermediate shaft 57 via a gear 58 meshed with the pinion gear 63 formed at the front end of the motor shaft 62. The motion conversion member 52 is configured to move reciprocatingly in the front-rear direction in conjunction with the rotation of the intermediate shaft 57. The arm portion 53 operably connects the motion conversion member 52 and the piston 54. The rotational motion of the intermediate shaft 57 is converted into a linear motion of the motion conversion mechanism 52, and is transmitted to the piston 54 via the arm portion 53.

The piston 54 is a bottomed cylindrical member, and is disposed in the cylinder 42 of the spindle 40 slidably along the driving axis AX1. The striker 55 is disposed in the piston 54 slidably along the driving axis AX1. An inner space in the rear of the striker 55 in the piston 54 is defined as an air chamber serving as an air spring. The impact bolt 56 is an intermediate element that transmits kinetic energy of the striker 55 to the tool accessory 11. The impact bolt 56 is disposed in the tool holder 41 in front of the striker 55 movably along the driving axis AX1.

When the rotational motion of the intermediate shaft 57 is converted into the linear motion and is transmitted to the piston 54 as described above, the piston 54 moves in the front-rear direction. At this time, the pressure of the air in the air chamber changes, and the striker 55 slides in the front-rear direction in the piston 54 under the action of the air spring. More specifically, when the piston 54 moves forward, the air in the air chamber is compressed and the inner pressure is raised. The striker 55 is pushed out forward at a high speed under the action of the air spring, and strikes the impact bolt 56. The impact bolt 56 transmits the kinetic energy of the striker 55 to the accessory tool 11. As a result, the accessory tool 11 is driven linearly along the driving axis AX1. On the other hand, when the piston 54 moves rearward, the air in the air chamber is expanded and the inner pressure is lowered. As a result, the striker 55 is pulled in rearward. The tool accessory 11 moves rearward together with the impact bolt 56 by being pressed against the workpiece. In this manner, the hammering operation is repeated by the hammer mechanism 51.

Further, the driving mechanism 50 includes a rotation transmission mechanism for the drilling operation. The rotation transmission mechanism includes a driving gear 59, and is configured to transmit the rotational motion of the intermediate shaft 57 to the spindle 40 to rotationally drive the tool accessory 11 around the driving axis AX1. More specifically, the driving gear 59 is fixed to the front end portion of the intermediate shaft 57. A driven gear 43, which is fixed to the outer periphery of the cylinder 42 of the spindle 40, is meshed with the driving gear 59. Due to that, the spindle 40 rotates integrally with the driven gear 43 in conjunction with the driving gear 59 rotating integrally with the intermediate shaft 57. This results in the execution of the drilling operation of rotationally driving the tool accessory 11 held by the tool holder 41 around the driving axis AX1.

In the present embodiment, the rotary hammer 10 has selectively executable three operation modes, namely, a hammering and drilling mode, a hammering mode, and a drilling mode. The hammering and drilling mode is an operation mode of performing the hammering operation and the drilling operation by driving both the hammer mechanism 51 and the rotation transmission mechanism. The hammering mode is an operation mode of performing only the hammering operation by blocking the power transmission for the drilling operation and driving only the hammer mechanism 51. The drilling mode is an operation mode of performing only the drilling operation by blocking the power transmission for the hammering operation and driving only the rotation transmission mechanism. These operation modes are switched in response to an operation of a mode switching dial 12. Such an operation mode switching mechanism is known, and therefore the description thereof will be omitted herein.

The above-described driving mechanism 50 is disclosed in, for example, US Patent Application Publication Nos. 2015/144366 and 2016/136801. The disclosures of US Patent Application Publication Nos. 2015/144366 and 2016/136801 are incorporated herein by reference in its entirety.

Figure 2:
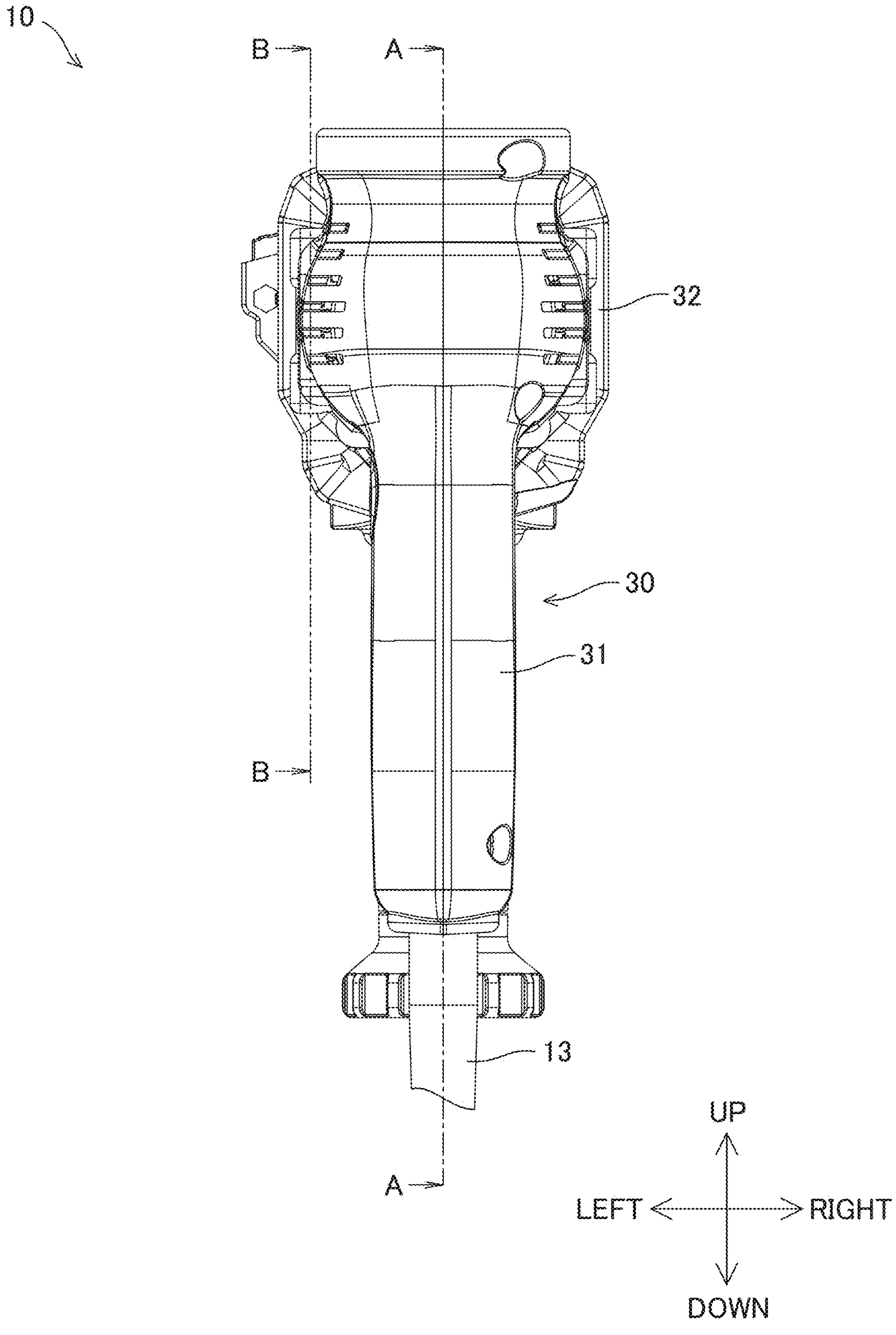
FIG. 2 is a rear view of the rotary hammer.

As illustrated in FIGS. 1 to 3, the handle 30 includes the grip portion 31 and a tubular portion 32. The tubular portion 32 is a tubular portion extending in the front-rear direction. As illustrated in FIG. 2, the tubular portion 32 is disposed outside the motor housing 22 in the radial direction with respect to the rotational axis AX2 so as to circumferentially surround the motor housing 22. The grip portion 31 is an elongated hollow body extending from the rear end of the tubular portion 32 in the direction intersecting with the rotational axis AX2. In the present embodiment, the tubular portion 32 and the front portion of the grip portion 31 are integrally formed. The handle 30 is formed by threadedly engaging left and right half-divided pieces.

A power source cable 13, which is connectable to an external alternating-current power source, extends out of the lower end of the grip portion 31. A trigger 14 is attached to the grip portion 31. The trigger 14 is intended to receive a pressing (triggering) operation performed by the user. A switch 15 is disposed in the grip portion 31. The switch 15 is brought into an ON state in response to the pressing operation performed on the trigger 14. When the switch 15 is brought into the ON state, the rotary hammer 10 causes the motor 60 to be energized to drive the driving mechanism 50, thereby performing the hammering operation and/or the drilling operation.

Figure 4:
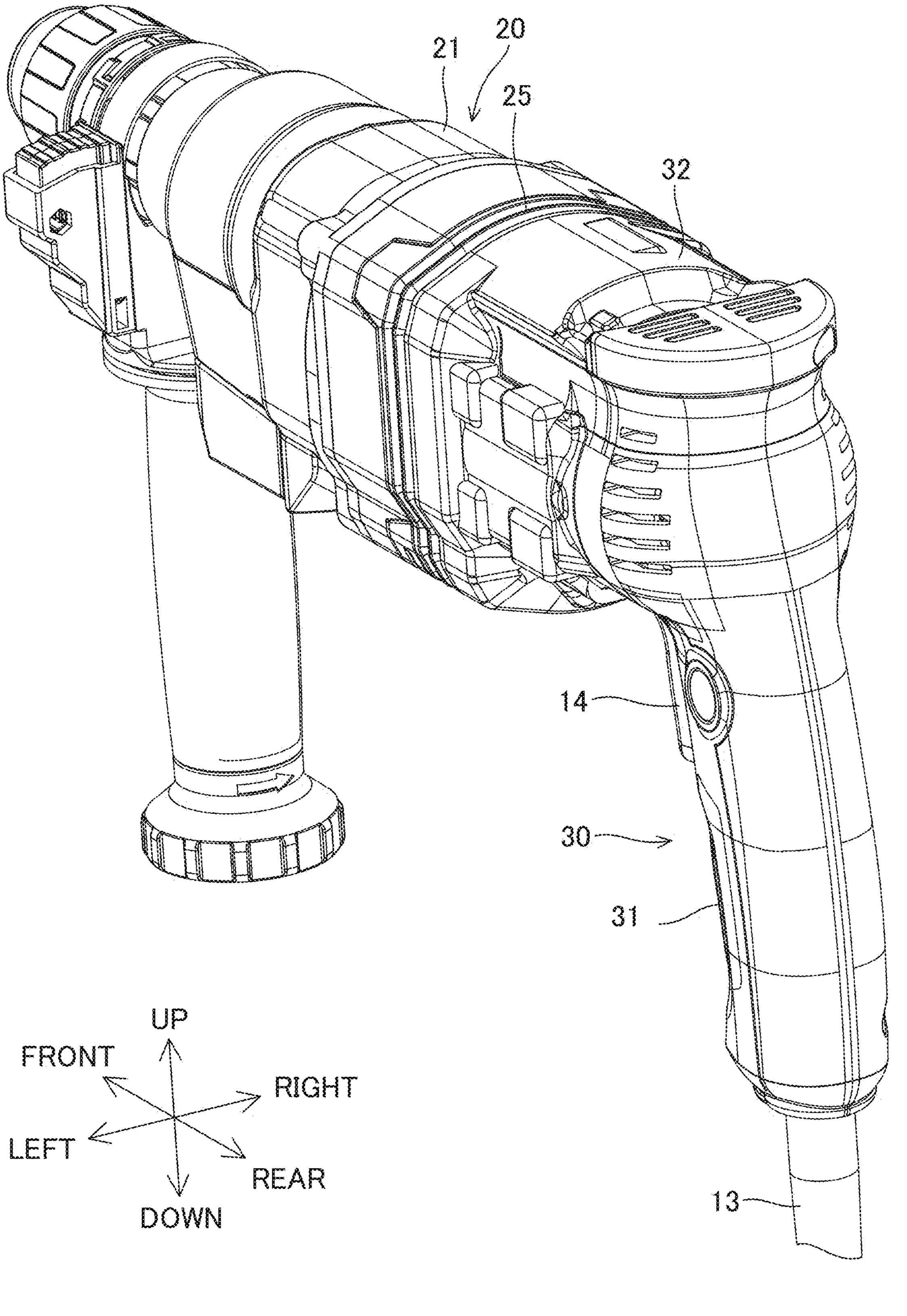
FIG. 4 is a perspective view of the rotary hammer.
Figure 5:
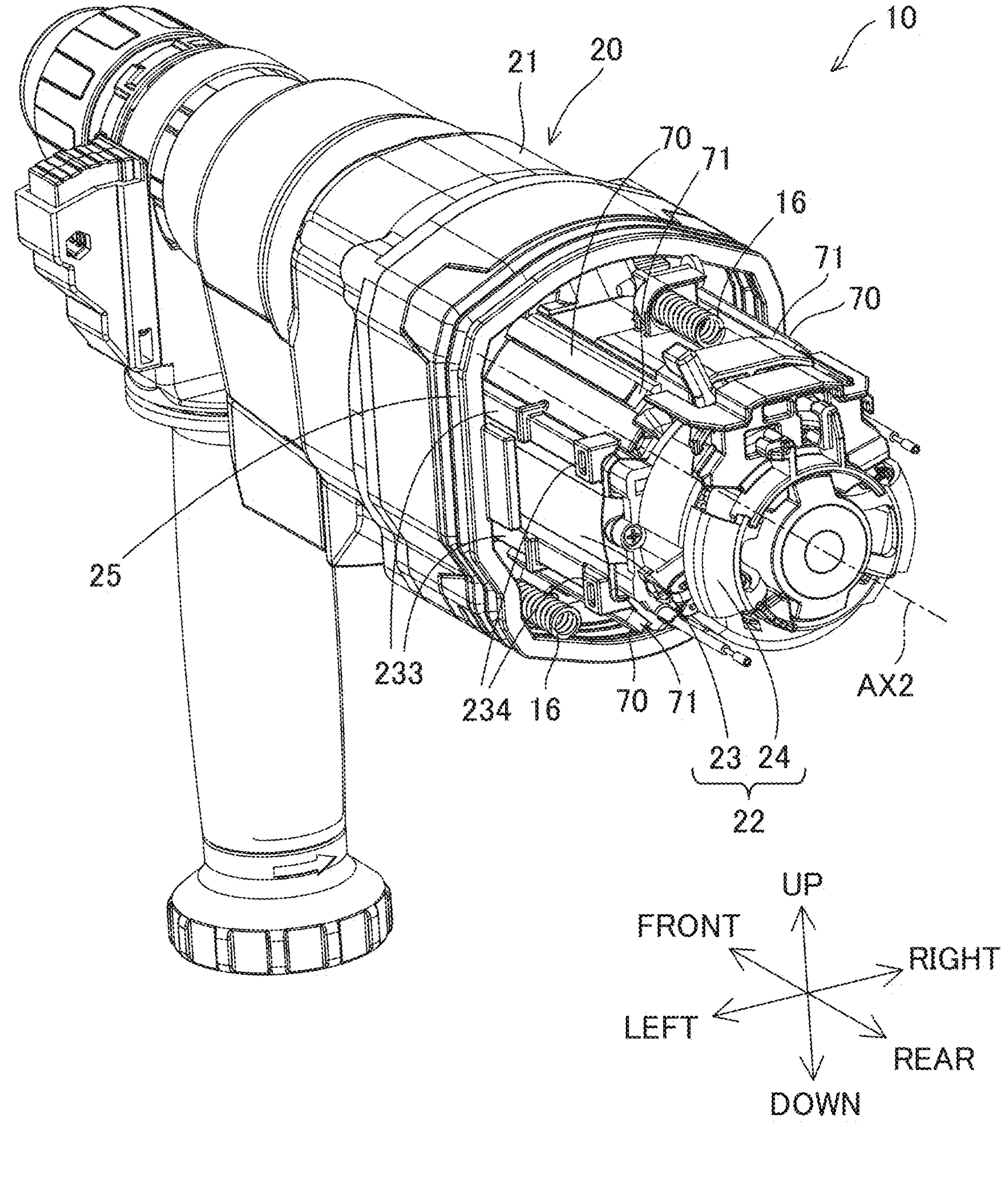
FIG. 5 is a perspective view of the rotary hammer with the handle removed therefrom.

In the present embodiment, the main body housing 20 and the handle 30 are coupled via an extendable and compressible bellows 25. More specifically, the bellows 25 is formed annularly so as to circumferentially surround the rotational axis AX2 as illustrated in FIGS. 4 and 5. The front edge of the bellows 25 is connected to the motor housing 22, and the rear edge of the bellows 25 is connected to the tubular portion 32 of the handle 30. According to the bellows 25, dust can be prevented from entering inside the rotary hammer 10 via a space between the main body housing 20 and the handle 30.

In the present embodiment, the rotary hammer 10 is configured to reduce the transmission of a vibration to the handle 30 occurring as the motor 60 and the driving mechanism 50 are driven. In the following description, a vibration-isolating structure of the rotary hammer 10 will be described.

Figure 6:
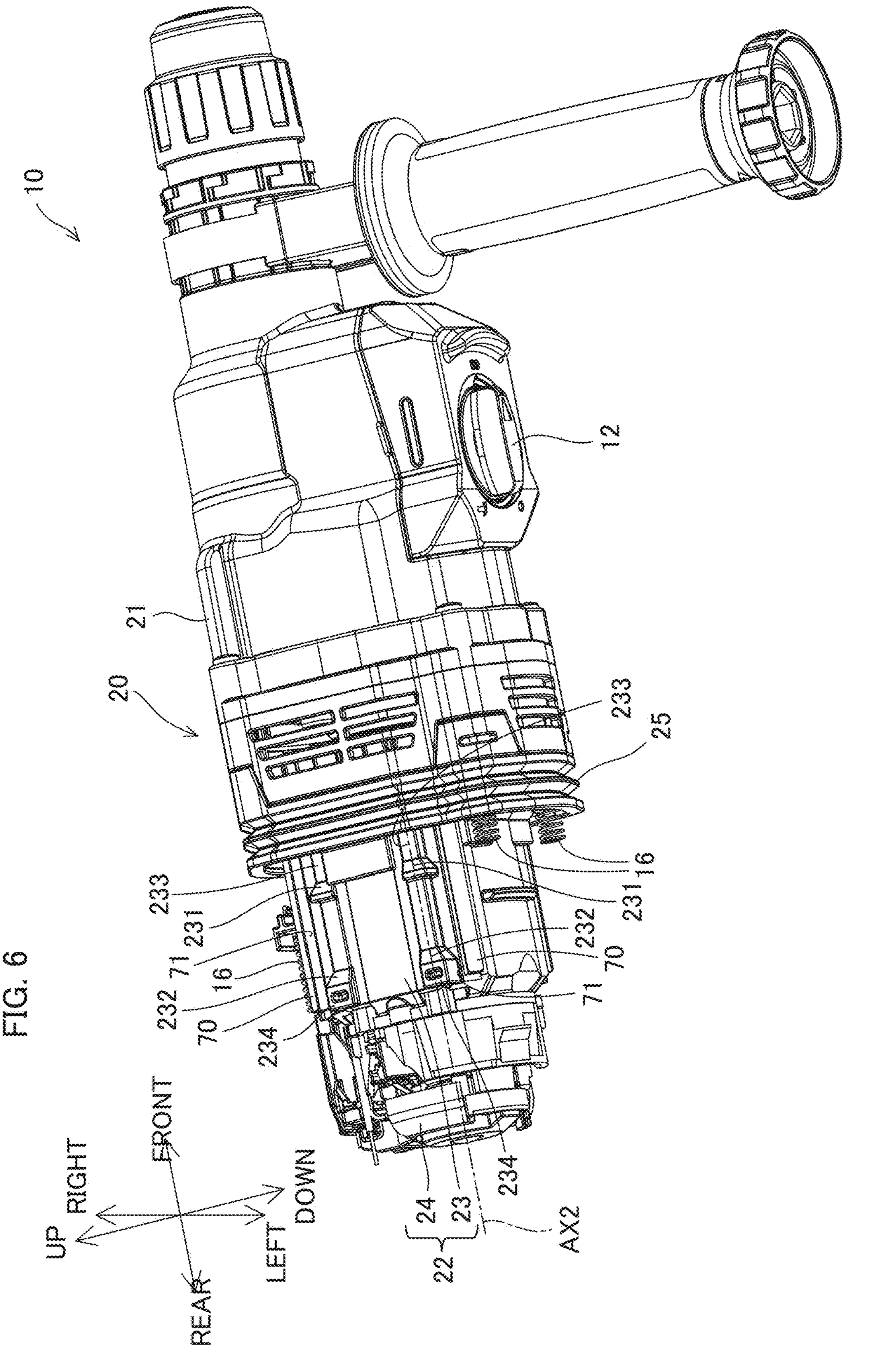
FIG. 6 is a perspective view of the rotary hammer with the handle removed therefrom.
Figure 7:
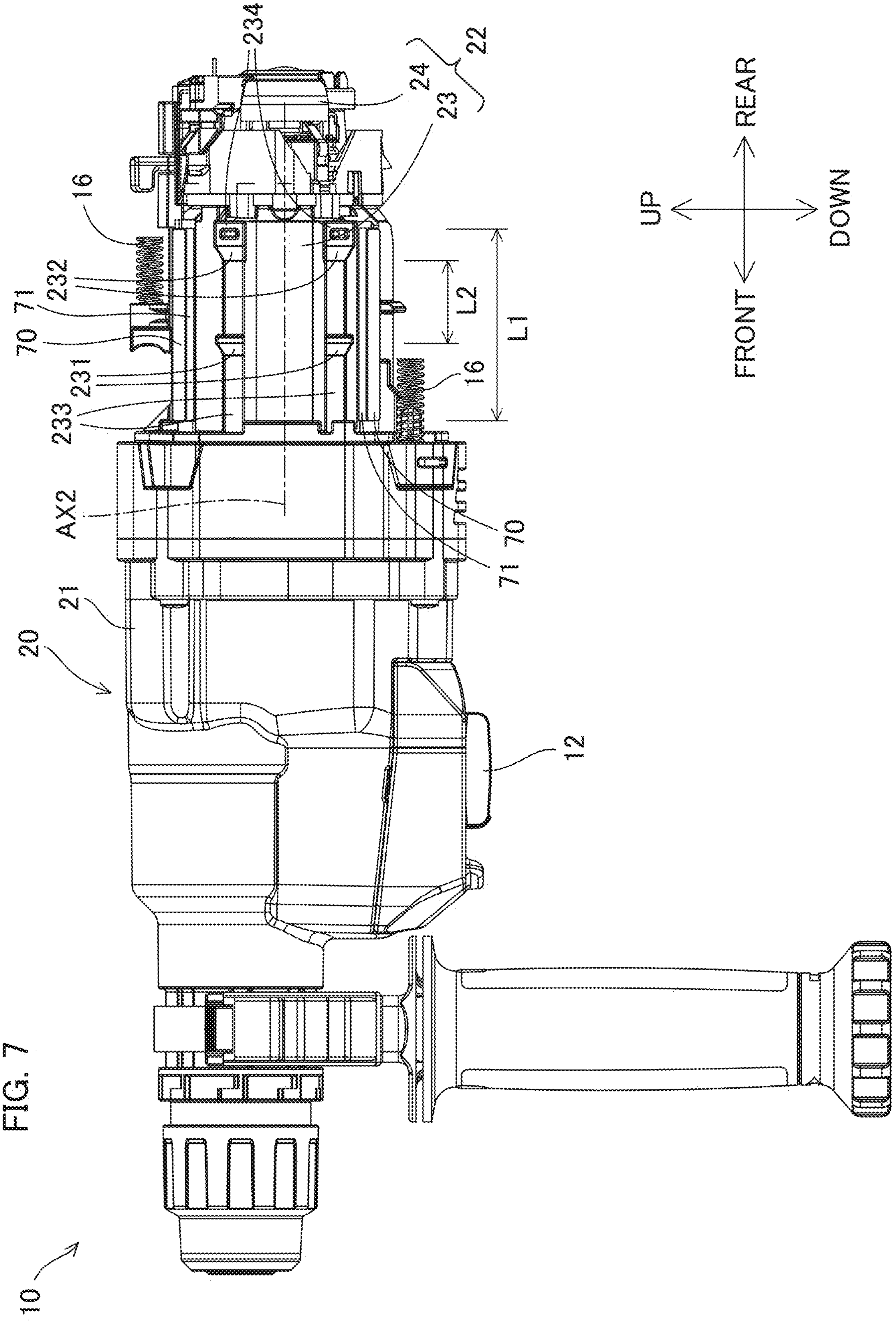
FIG. 7 is a left side view of the rotary hammer with the handle removed therefrom.

As the vibration-isolating structure, the main body housing 20 and the handle 30 are configured to be relatively movable in the front-rear direction. This relative movement is slidably guided by four guide members 70, which are disposed between the main body housing 20 (more specifically, the motor housing 22) and the handle 30 (more specifically, the tubular portion 32) and extend in the front-rear direction. In the present embodiment, the guide members 70 are mounted on the motor housing 22 (more specifically, the tubular portion 23) via elastic members 71. More specifically, as illustrated in FIGS. 5 to 7, the elastic members 71 are fixed to the tubular portion 23 of the motor housing 22, and the guide members 70 are fixed further on the elastic members 71 (i.e., on the surfaces of the elastic members 71 opposite from the tubular portion 23). In the present embodiment, an adhesive is used for the fixation between the elastic members 71, the guide members 70, and the tubular portion 23. However, any fixation method can be used instead of the adhesive.

Figure 12:
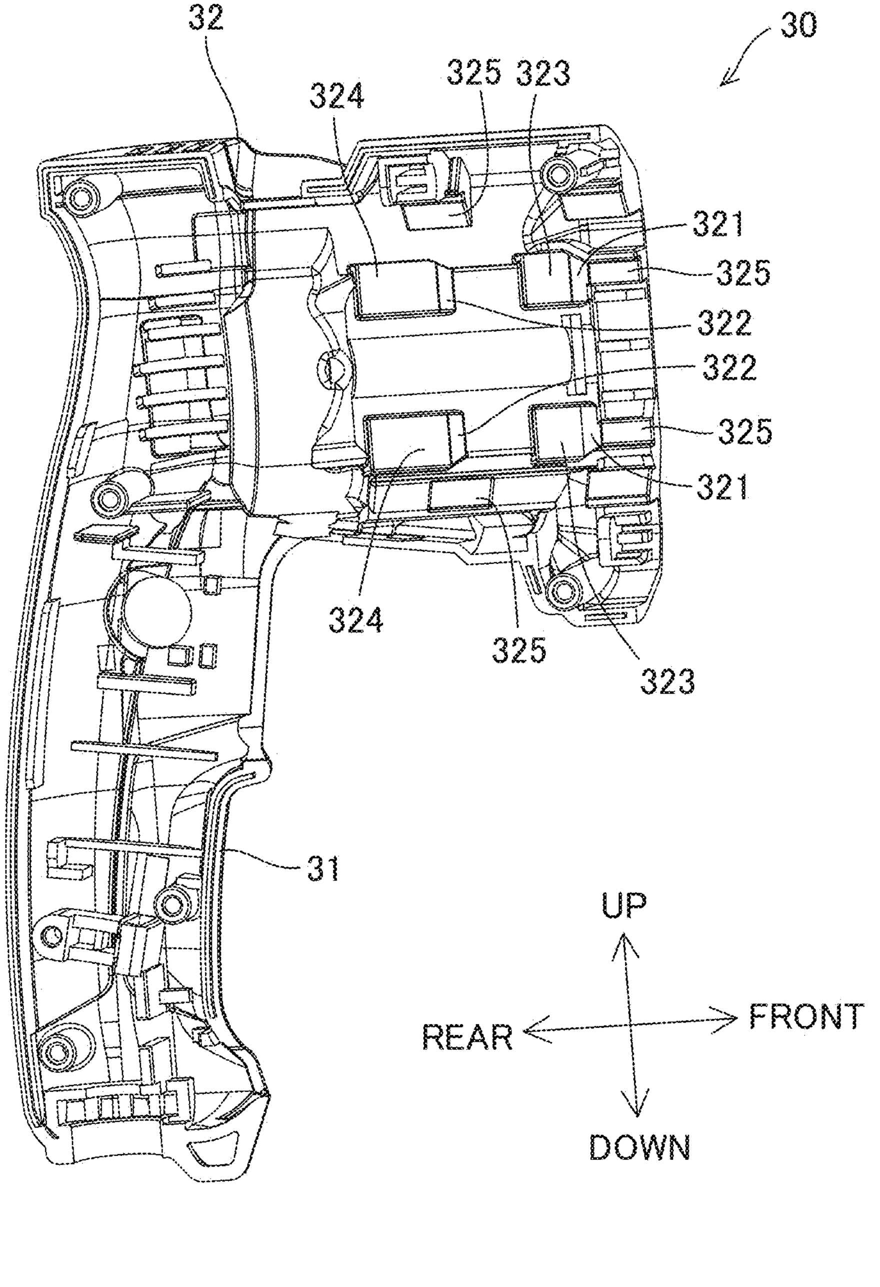
FIG. 12 is a side view illustrating a left half of the handle.

The handle 30 slides on the guide members 70 when the main body housing 20 and the handle 30 relatively move in the front-rear direction. More specifically, the handle 30 includes sliding flat surfaces 325 inside the handle 30 as illustrated in FIG. 12. The sliding flat surfaces 325 are directed in parallel to the radially outer surfaces of the guide members 70. The relative movement between the main body housing 20 and the handle 30 in the front-rear direction is realized due to the sliding movement of these sliding flat surfaces 325 on the guide members 70. The guide members 70 extend elongatedly in the front-rear direction, and the longitudinal direction thereof coincides with the front-rear direction. As illustrated in FIG. 7, the guide members 70 extend approximately entirely throughout the tubular portion 23 in the front-rear direction. A stable sliding movement between the main body housing 20 and the handle 30 can be acquired by securing as long lengths of the guide members 70 as possible in this manner. The guide members 70 are made from metal in the present embodiment, but may be made from another material (for example, hard resin). Further, each of the guide members 70 is in the form of in the present embodiment, but each of the guide members 70 can be in any other form (for example, in the form of a pin circular in cross section).

The elastic members 71 are sponges, i.e., foamed resin (for example, polyurethane) in the present embodiment. However, the elastic members 71 are not limited to sponges, and may be any elastic members elastically deformable in a direction intersecting with the front-rear direction (hereinafter also referred to as an intersection direction). For example, the elastic members 71 may be made of flexible resin such as silicone resin or urethane. The elastic members 71 are disposed between the guide members 70 and the motor housing 22 (the tubular portion 23) in an uncompressed state. Therefore, the elastic members 71 can be elastically deformed (squeezed) in the radial direction with respect to the rotational axis AX2 of the motor shaft 62 when being subjected to a force in the direction intersecting with the rotational axis AX2. In an alternative embodiment, the elastic members 71 may be disposed in a slightly compressed state by being radially pressed by the handle 30 (the tubular portion 32).

Figure 13:
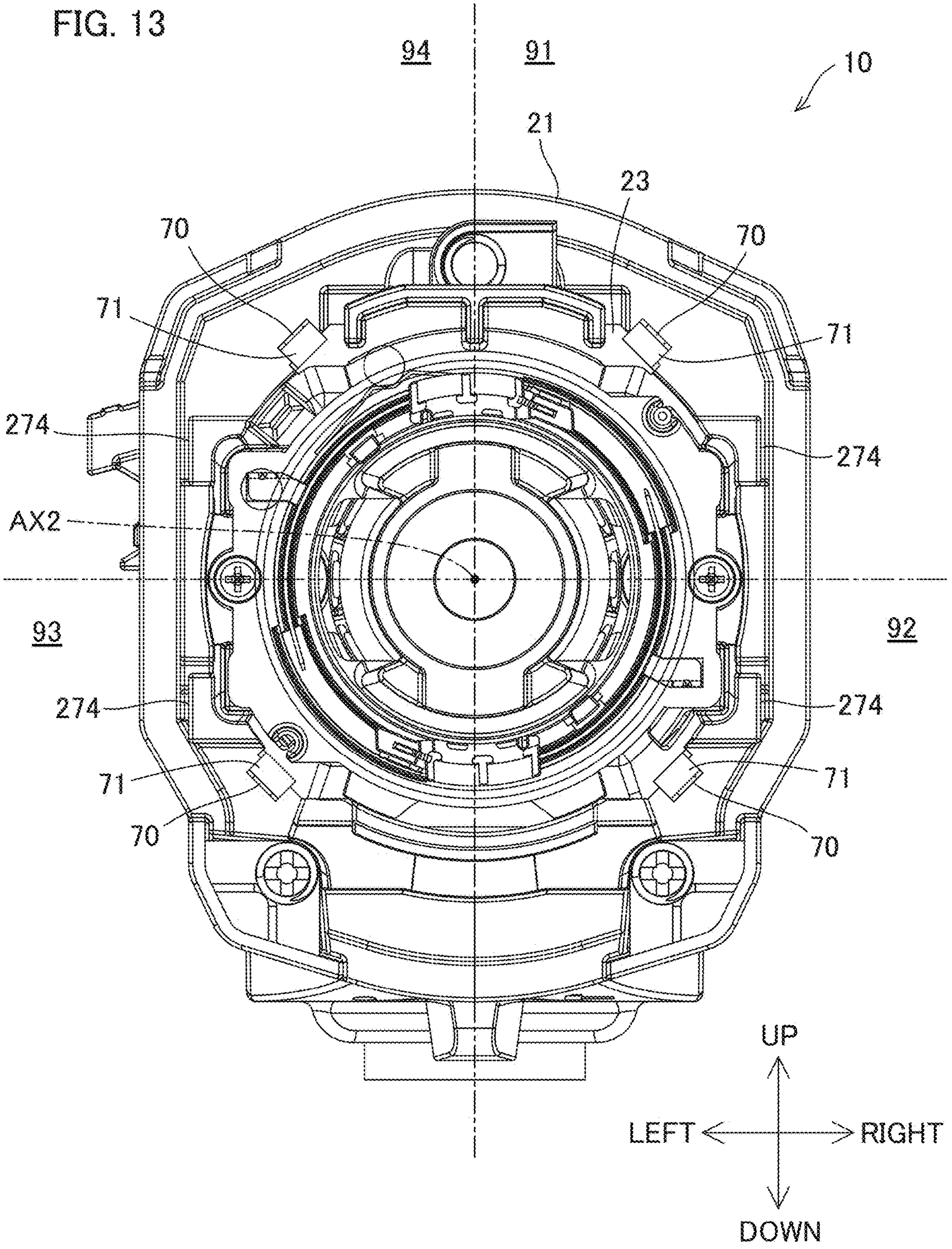
FIG. 13 is a rear view of the rotary hammer with a part of components including the handle removed therefrom.

As illustrated in FIGS. 5, 6, and 13, the four sets of the guide members 70 and the elastic members 71 are arranged so as to be spaced apart from each other in the circumferential direction with respect to the rotational axis AX2. In this manner, the circumferentially distributed arrangement of the guide members 70 allows the rotary hammer 10 to acquire further smooth slidability and reduce wobbling of the handle 30 from the rotational axis AX2 at the time of the sliding movement.

In the configuration in which the handle 30 is movable relative to the main body housing 20 in the front-rear direction in this manner, the handle 30 is constantly biased rearward (i.e., away from the spindle 40 in the front-rear direction). More specifically, the rotary hammer 10 includes three biasing springs 16 as illustrated in FIGS. 5 to 7. In the present embodiment, the biasing springs 16 are in the form of coil springs, and are disposed in a compressed state between the tubular portion 23 and the tubular portion 32. The three biasing springs 16 are arranged at even intervals in the circumferential direction with respect to the rotational axis AX2. Therefore, the biasing springs 16 can evenly bias the handle 30 in a plane orthogonal to the rotational axis AX2.

Figure 8:
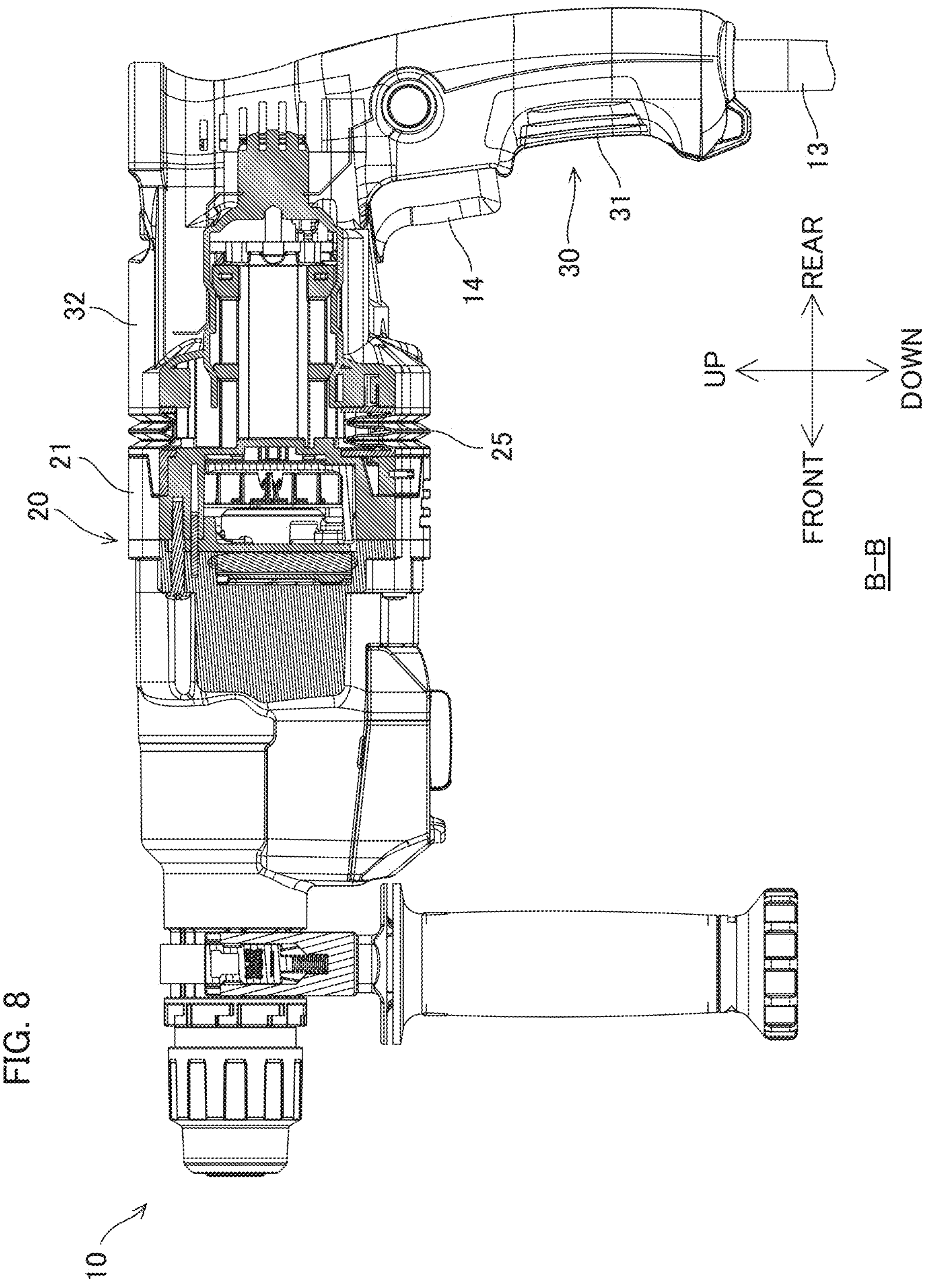
FIG. 8 is a vertical cross-sectional view of the rotary hammer taken along a line B-B illustrated in FIG. 2 with the handle located at the initial position relative to the main body housing.
Figure 9:
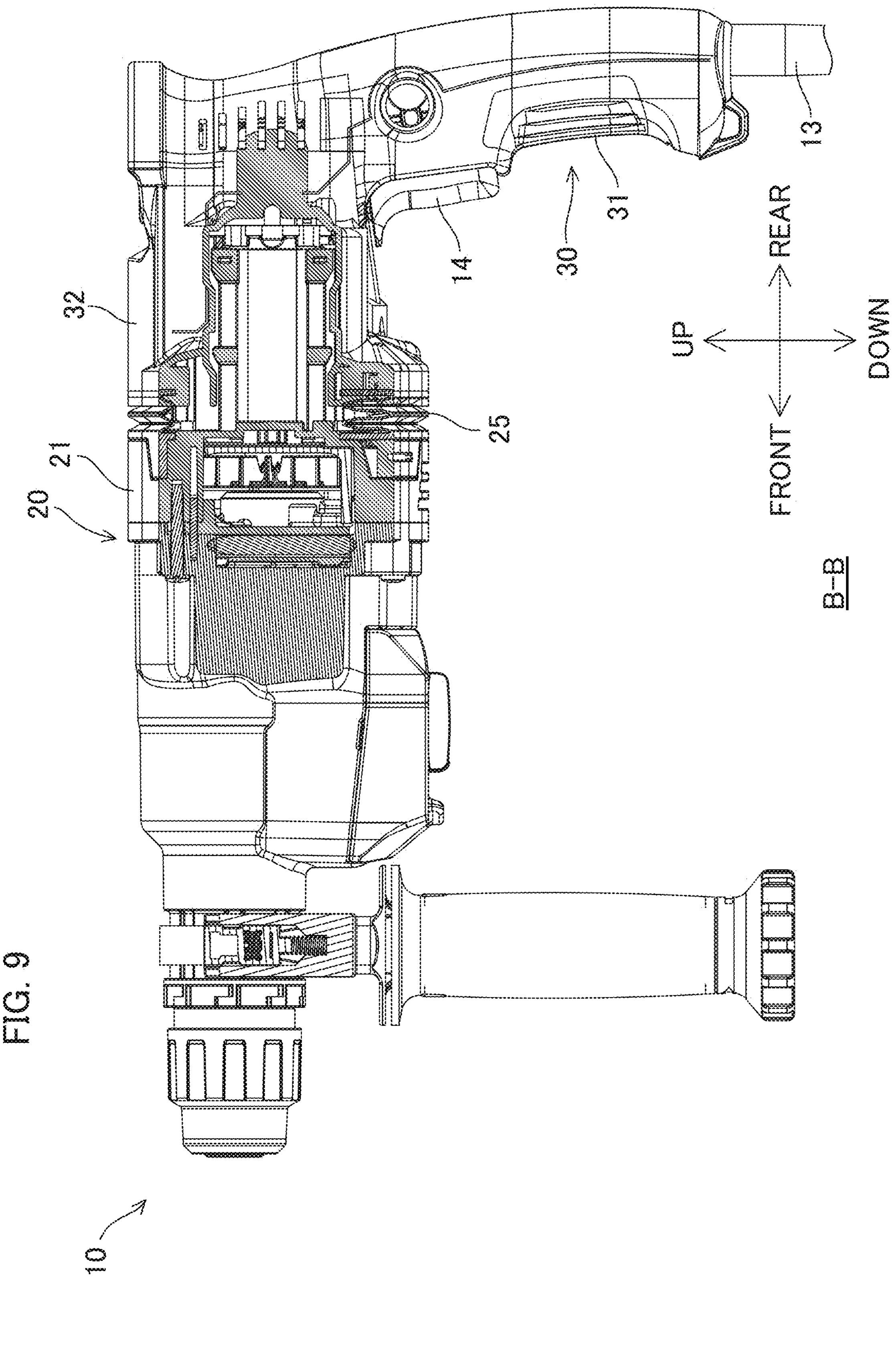
FIG. 9 is a vertical cross-sectional view of the rotary hammer taken along the line B-B illustrated in FIG. 2 with the handle located at a closest position relative to the main body housing.

Due to such a configuration, the rotary hammer 10 allows the handle 30 to move relative to the main body housing 20 in the front-rear direction between an initial position illustrated in FIGS. 1, 3, and 8 and a closest position illustrated in FIG. 9. The initial position is a relative position of the handle 30 in a state that the main body housing 20 and the handle 30 are not subjected to a force in the front-rear direction (i.e., in a state that the tool accessory 11 held by the spindle 40 is not pressed against the workpiece). At the initial position, the handle 30 is located at a position farthest away from the main body housing 20 (the motor housing 22) (i.e., a position maximally separated from the main body housing 20) in the front-rear direction. The closest position is a relative position of the handle 30 in a state that a rearward force is applied to the main body housing 20 and the main body housing 20 and the handle 30 are located most closely to each other in the front-rear direction. Each of the initial position and the closest position is defined by abutment between abutment portions (not illustrated) respectively formed on the motor housing 22 and the handle 30.

According to the above-described rotary hammer 10, when the tool accessory 11 is subjected to a rearward reaction force during the hammering operation, the spindle 40 holding the tool accessory 11 and the main body housing 20 supporting the driving mechanism 50 are also subjected to the rearward reaction force. Due to that, the handle 30 can move relative to the main body housing 20 between the initial position and the closest position. In other words, the handle 30 relatively moves toward the spindle 40 in the front-rear direction against the biasing forces of the biasing springs 16 while the main body housing 20 and the handle 30 are slidably guided by the guide members 70. A part of the reaction force is damped with the aid of the elastic deformation of the biasing springs 16 at this time. This damping effect works to reduce the transmission of a vibration in the front-rear direction to the handle 30 that occurs due to the reaction force.

Further, according to the rotary hammer 10, when a vibration in the intersection direction occurs due to the driving of the motion conversion member 52 and the motor 60, the elastic members 71 disposed between the motor housing 22 and the tubular portion 32 of the handle 30 are elastically deformed in this vibration direction to absorb this vibration. Therefore, the transmission to the handle 30 is also reduced with respect to the vibration in the intersection direction. Further, in the present embodiment, the sponges having an easily deformable property are used as the elastic members 71. This can ensure that the elastic members 71 are elastically deformed in the intersection direction by a large amount. As a result, the effect of reducing the transmission to the handle 30 is improved with respect to the vibration in the intersection direction.

Further, the elastic members 71 are disposed at four positions distributed along the circumferential direction, and the elastic members 71 located at circumferentially different positions are elastically deformed in directions different from one another. Therefore, the effect of reducing the transmission to the handle 30 is improved with respect to the vibration in the intersection direction.

The rotary hammer 10 has a configuration capable of ensuring that the rotary hammer 10 has excellent feeling of use while achieving such an effect of reducing the transmission of the vibration in the intersection direction to the handle 30. In the following description, such a configuration will be described.

As illustrated in FIGS. 5 to 7, the tubular portion 23 of the motor housing 22 includes four sets of first front-side abutment portions 231, first rear-side abutment portions 232, front-side stopper portions 233, and rear-side stopper portions 234 on the outer surface thereof. These four sets are each arranged so as to be spaced apart in the circumferential direction with respect to the rotational axis AX2. In each of the sets, the first front-side abutment portion 231, the first rear-side abutment portion 232, the front-side stopper portion 233, and the rear-side stopper portion 234 are arranged so as to be lined up linearly in the front-rear direction.

Figure 11:
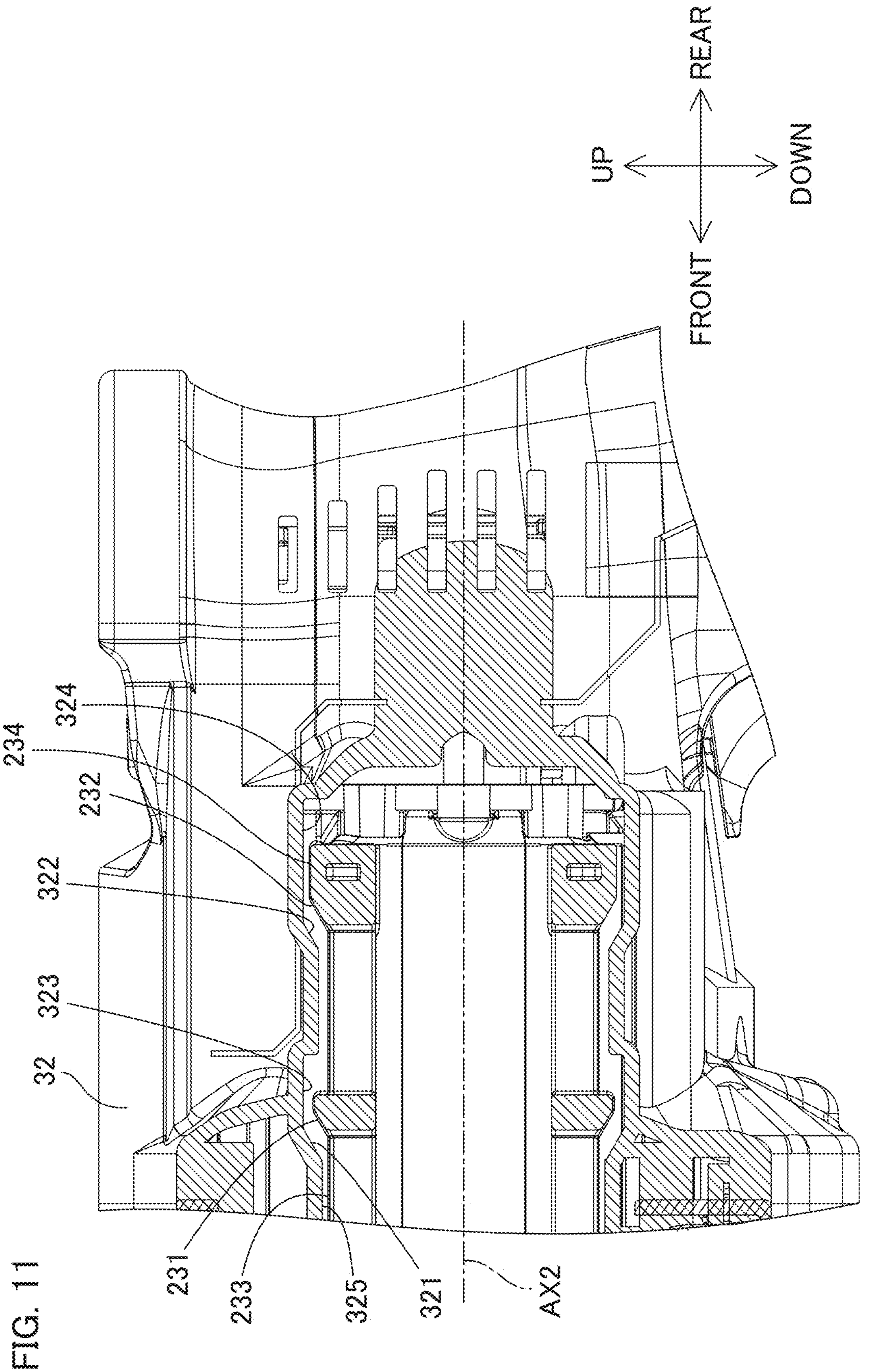
FIG. 11 is a partial enlarged view of FIG. 9.

As most clearly seen from FIG. 11, in the present embodiment, each of the first front-side abutment portion 231 and the first rear-side abutment portion 232 is in the form of a tapered surface getting closer to the rotational axis AX2 forward (i.e., toward the spindle 40). In other words, the tapered surface extends so as to be located on a further radially inner side toward the front. In the present embodiment, the front-side stopper portion 233 is a flat surface portion continuous to the front edge portion of the first front-side abutment portion 231. Further, in the present embodiment, the rear-side stopper portion 234 is a flat surface portion continuous to the rear edge portion of the first rear-side abutment portion 232.

As illustrated in FIGS. 11 and 12, the tubular portion 32 of the handle 30 includes four sets of second front-side abutment portions 321, second rear-side abutment portions 322, front-side recessed portions 323, and rear-side recessed portions 324 inside the tubular portion 32 (only two sets on the left side are visible in FIG. 12). These four sets are each arranged so as to be spaced apart in the circumferential direction with respect to the rotational axis AX2. The circumferential positions of the four sets of the second front-side abutment portions 321, the second rear-side abutment portions 322, the front-side recessed portions 323, and the rear-side recessed portions 324 are aligned with the circumferential positions of the four sets of the first front-side abutment portions 231, the first rear-side abutment portions 232, the front-side stopper portions 233, and the rear-side stopper portions 234, respectively. The second front-side abutment portion 321, the second rear-side abutment portion 322, the front-side recessed portion 323, and the rear-side recessed portion 324 are arranged so as to be lined up linearly in the front-rear direction in each of the sets on the tubular portion 32.

As most clearly seen from FIG. 11, in the present embodiment, each of the second front-side abutment portion 321 and the second rear-side abutment portion 322 is in the form of a tapered surface getting closer to the rotational axis AX2 forward (i.e., toward the spindle 40). In other words, the tapered surface extends so as to be located on a further radially inner side toward the front. The inclination angles of the second front-side abutment portion 321 and the second rear-side abutment portion 322 in the form of the tapered surface are equal to the inclination angles of the first front-side abutment portion 231 and the first rear-side abutment portion 232 in the form of the tapered surface, respectively. The front-side recessed portion 323 is a flat surface continuous to the rear edge portion of the second front-side abutment portion 321 in the form of the tapered surface. The rear-side recessed portion 324 is a flat surface continuous to the rear edge portion of the second rear-side abutment portion 322 in the form of the tapered surface.

Figure 10:
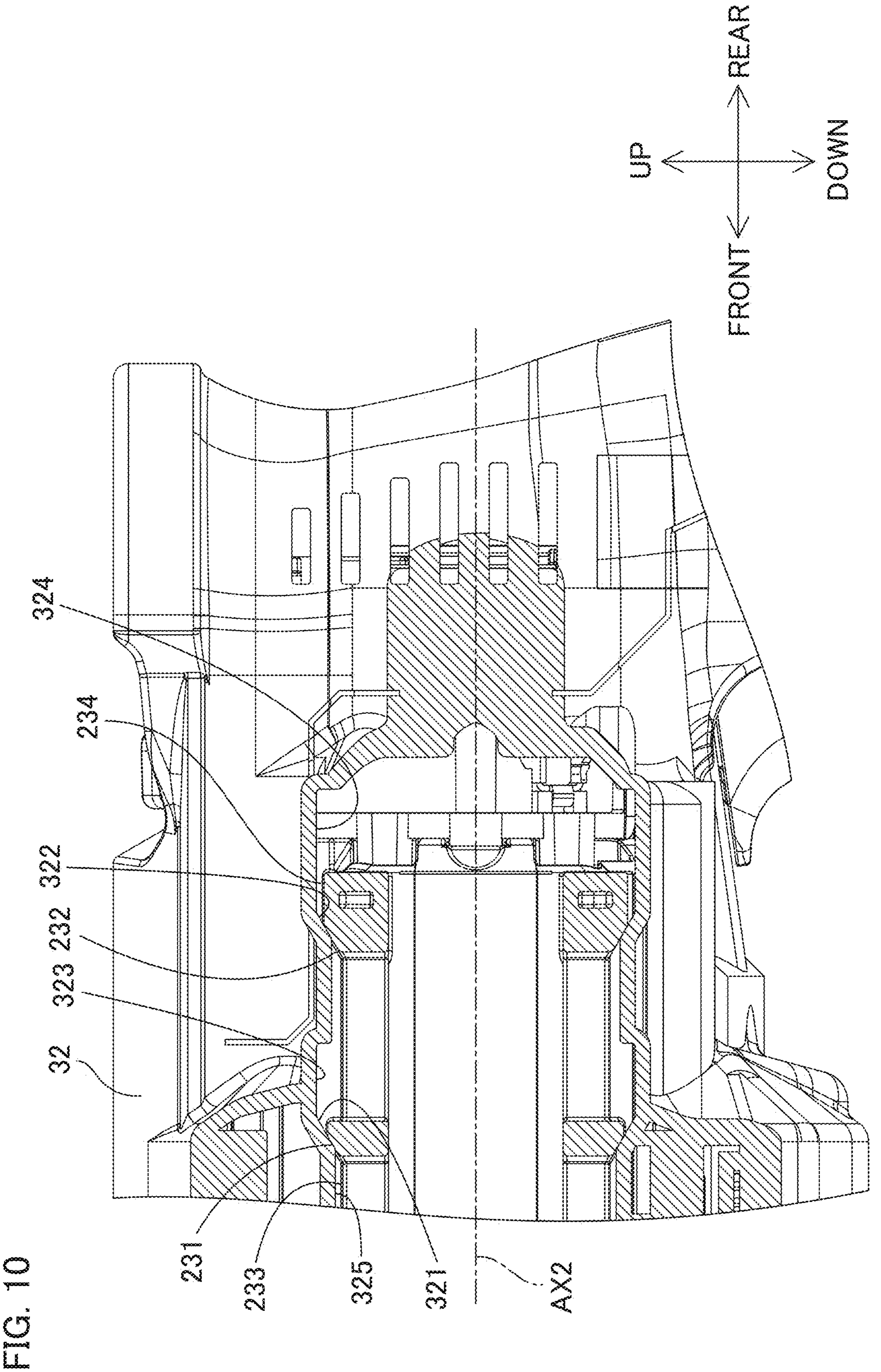
FIG. 10 is a partial enlarged view of FIG. 8.

As illustrated in FIGS. 8 and 10, the four first front-side abutment portions 231 and the four second front-side abutment portions 321 are in abutment with each other when the handle 30 is located at the initial position relative to the main body housing 20. In this state, the radial clearances between the first front-side abutment portions 231 and the second front-side abutment portions 321 are zero. Similarly, the four first rear-side abutment portions 232 and the four second rear-side abutment portions 322 are in abutment with each other (i.e., the tapered surfaces are in planar contact with each other). In this state, the radial clearances between the first rear-side abutment portions 232 and the second rear-side abutment portions 322 are zero.

In such an abutment state, the handle 30 cannot be displaced radially relative to the main body housing 20. Therefore, when the user holds the rotary hammer 10 in his/her hand in this state, the rotary hammer 10 can be prevented from radially rattling between the handle 30 and the main body housing 20. As a result, the feeling of use of the rotary hammer 10 is improved.

Especially, in the present embodiment, the abutment state is established at two positions spaced apart in the front-rear direction, and therefore the radial rattling can be further stably reduced. However, the abutment state may be established only at one position. In other words, one of the combination of the first front-side abutment portion 231 and the second front-side abutment portion 321 and the combination of the first rear-side abutment portion 232 and the second rear-side abutment portion 322 may be omitted.

Further, in the present embodiment, the abutment state is established at four positions circumferentially spaced apart, and therefore the radial rattling can be further stably reduced. However, the shapes of the motor housing 22 and the tubular portion 32 may be changed in such a manner that the abutment state is established only at one position, two positions, or three positions, or the abutment portion is established at five or more positions. The radial rattling can be significantly reduced by establishing the abutment state on at least three or more positions.

On the other hand, when the tool accessory 11 is pressed against the workpiece to machine the workpiece by the rotary hammer 10, the handle 30 starts moving relative to the main body housing 20 from the initial position toward the closest position. This causes, for example, the four first front-side abutment portions 231 and the four second front-side abutment portions 321 to be spaced apart from each other, thereby allowing the handle 30 to be radially displaced relative to the main body housing 20, as illustrated in FIGS. 9 and 11. As a result, when a vibration in the intersection direction (the direction intersecting with the front-rear direction) occurs, the elastic members 71 are elastically deformed in the direction intersecting with the front-rear direction as described above, thereby reducing the transmission of the vibration in the intersection direction to the handle 30.

Further, in the present embodiment, when the handle 30 is radially displaced relative to the main body housing 20 by a predetermined amount in the state that the tool accessory 11 is pressed against the workpiece, the front-side stopper portions 233 and the front-side stopper portions 325 of the handle 30 are brought into planar contact with each other and the rear-side stopper portions 234 and the rear-side recessed portions 324 are also brought into planar contact with each other. Due to that, a further radial relative displacement between the handle 30 and the main body housing 20 is restricted. According to this configuration, a radial relative displacement between the handle 30 and the main body housing 20 can be restricted before reaching a limit on the elastic deformation of the elastic members 71. Therefore, the rotary hammer 10 can be prevented from excessively radially rattling between the handle 30 and the main body housing 20. As a result, the feeling of use of the rotary hammer 10 is improved.

In the present embodiment, the above-described abutment state is established with the aid of the tapered surfaces. Therefore, when the handle 30 starts moving relative to the main body housing 20 from the initial position toward the closest position (i.e., when the user starts pressing the tool accessory 11 against the workpiece to machine it), the four first front-side abutment portions 231 and the four second front-side abutment portions 321 are immediately separated from each other, generating clearances allowing the handle 30 and the main body housing 20 to radially move relative to each other (clearances bringing about the above-described vibration-isolating effect). Therefore, the vibration-isolating performance can be improved. In addition, the first front-side abutment portions 231 and the four second front-side abutment portions 321 in the form of the tapered surface can function as guides when the handle 30 returns to the initial position.

In the present embodiment, the planar contact is established at two positions spaced apart in the front-rear direction, and therefore the radial rattling can be further stably reduced. However, the planar contact may be established only at one position. Alternatively, the shapes of the motor housing 22 and the tubular portion 32 may be changed in such a manner that the planar contact is established at three or more positions. Further, the shapes of the motor housing 22 and the tubular portion 32 may be changed so as to bring the motor housing 22 and the tubular portion 32 into linear contact or point contact with each other instead of the planar contact.

Further, in the present embodiment, the planar contact is established at four positions circumferentially spaced apart, and therefore the radial rattling can be further stably reduced. However, the shapes of the motor housing 22 and the tubular portion 32 may be changed in such a manner that the planar contact is established only at one position, two positions, or three positions, or the planar contact is established at five or more positions. The radial rattling can be significantly reduced by establishing the planar contact on at least three or more positions.

In addition, in the present embodiment, the first rear-side abutment portions 232 and the rear-side stopper portions 234 has a integral structure continuous from each other, and therefore the shape of the tubular portion 23 can be simplified. Similarly, the first front-side abutment portions 231 and the front-side stopper portions 233 has a integral structure continuous from each other, and therefore the shape of the tubular portion 23 can be simplified. However, the first rear-side abutment portions 232 and the rear-side stopper portions 234 may be spaced apart from each other. Similarly, the first front-side abutment portions 231 and the front-side stopper portions 233 may be spaced apart from each other.

When four quadrants 91 to 94 defined based on the up-down direction and the left-right direction are set with an origin placed at the rotational axis AX2 as illustrated in FIG. 13, the sets of the guide members 70 and the abutment portions (the first front-side abutment portions 231 and the first rear-side abutment portions 232) are disposed in the quadrants 91 to 94, respectively, as illustrated in FIGS. 5 to 7 and 13. Therefore, in the state that the tool accessory 11 is not pressed against the workpiece (i.e., when the handle 30 is located at the initial position), the first front-side abutment portions 231 and the first rear-side abutment portions 232, and the second front-side abutment portions 321 and the second rear-side abutment portions 322 are respectively in abutment with each other at four positions distributed in a well-balanced manner to the four quadrants 91 to 94. Therefore, the radial rattling between the handle 30 and the motor housing 22 can be further reduced, and the feeling of use of the rotary hammer 10 is further improved. Further, in the present embodiment, the guide members 70 and the first abutment portions (the first front-side abutment portions 231 and the first rear-side abutment portions 232) are arranged in such a manner that the distances between the guide members 70 and the first abutment portions adjacent to each other are respectively shorter than the distances between the two guide members 70 adjacent to each other. According to this configuration, the distances between the guide members 70 and the first abutment portions are relatively shortened, and therefore the radial rattling between the handle 30 and the motor housing 22 can be further reduced when the handle 30 is separated from the first relative position, and the feeling of use of the rotary hammer 10 is further improved.

Further, the sets of the stopper portions (the front-side stopper portions 233 and the rear-side stopper portions 234) and the elastic members 71 are disposed in the quadrants 91 to 94, respectively, as illustrated in FIGS. 5 to 7 and 13. Then, the four sets of the stopper portions and the elastic members 71 are arranged in such a manner that the distances between the front-side stopper portions 233 and the elastic members 71 adjacent to each other and the distances between the rear-side stopper portions 234 and the elastic members 71 adjacent to each other are respectively shorter than the distances between the two front-side stopper portions 233 adjacent to each other and the rear-side stopper portions 234 adjacent to each other in the circumferential direction with respect to the rotational axis AX2. Therefore, the distances between the elastic members 71 and the stopper portions 233 and 234 (these stopper portions restrict the relative radial displacement between the handle 30 and the main body housing 20) are relatively shortened, and this makes it easier to restrict the radial elastic deformation amounts of the elastic members 71. In addition, the elastic members 71 and the stopper portions 233 and 234 are respectively disposed at four positions distributed in a well-balanced manner to the four quadrants 91 to 94, and this allows the handle 30 to be displaced relative to the main body housing 20 with the displacement amount thereof kept even regardless of which radial direction the handle 30 is displaced in. Therefore, the radial rattling between the handle 30 and the motor housing 20 can be further reduced when the tool accessory 11 is pressed against the workpiece to machine the workpiece, and the feeling of use of the rotary hammer 10 is further improved.

Further, in the present embodiment, a separation distance L2 between the first front-side abutment portion 231 and the first rear-side abutment portion 232 is set to ⅓ or more of a distance L1 by which the guide member 70 extends in the front-rear direction as illustrated in FIG. 7. Therefore, the separation distance between the first front-side abutment portion 231 and the first rear-side abutment portion 232 in the front-rear direction can be relatively increased. Therefore, the radial rattling between the handle 30 and the motor housing 22 can be further stably reduced in the state that the tool accessory 11 is not pressed against the workpiece (i.e., when the handle 30 is located at the initial position).

The corresponding relationship between each component in the above-described embodiment and each component of the present invention will be described below. However, each component in the embodiment is merely one example and shall not limit each component of the present invention. The rotary hammer 10 is one example of a "power tool having a hammer mechanism". The tool accessory 11 is one example of a "tool accessory". The spindle 40 is one example of a "final output shaft". The driving axis AX1 is one example of a "driving axis". The motor 60 is one example of a "motor". The rotational axis AX2 is one example of a "rotational axis". The driving mechanism 50 is one example of a "driving mechanism". The motor housing 22 is one example of a "housing". The handle 30 is one example of a "handle". The tubular portion 32 is one example of a "first portion". The grip portion 31 is one example of a "second portion". The biasing spring 16 is one example of a "biasing member". The guide member 70 is one example of "at least one guide member". The elastic member 71 is one example of "at least one elastic member". The first front-side abutment portion 231 and the first rear-side abutment portion 232 are one example of "at least one first abutment portion". The second front-side abutment portion 321 and the second rear-side abutment portion 322 are one example of "at least one second abutment portion". The first front-side abutment portion 231 is one example of a "first front-side abutment portion". The first rear-side abutment portion 232 is one example of a "first rear-side abutment portion". The second front-side abutment portion 321 is one example of a "second front-side abutment portion". The second rear-side abutment portion 322 is one example of a "second rear-side abutment portion". The front-side stopper portion 233 and the rear-side stopper portion 234 are one example of a "stopper portion". The front-side stopper portion 233 is one example of a "front-side stopper portion". The rear-side stopper portion 234 is one example of a "rear-side stopper portion". The initial position is one example of a "first relative position". Any position between the initial position and the closest position, and the closest position are one example of a "second relative position".

Having described several embodiments, the above-described embodiments are intended to only facilitate the understanding of the present teachings, and are not intended to limit the present invention thereto. The present invention can be modified or improved without departing from the spirit thereof, and the present invention includes equivalents thereof. Further, each of the forms/elements described in the claims and the specification can be combined or omitted in any manner within a range that allows it to remain capable of solving at least a part of the above-described problems or bringing about at least a part of the above-described advantageous effects.

For example, the guide members 70 and the elastic members 71 may be fixed to the handle 30 instead of the motor housing 22. According to this configuration, the elastic members 71 are fixed to the inner surface of the handle 30, and the guide members 70 are fixed to the elastic members 71 in such a manner that the elastic members 71 are located between the handle 30 and the guide members 70. Further, the motor housing 22 slides on the guide members 70.

Alternatively, the elastic members 71 may be omitted. In this case, the guide members 70 may be fixed directly to the motor housing 22 or the handle 30. This configuration can also reduce the transmission of the vibration in the direction intersecting with the axial direction to the handle due to the clearances between the main body housing 20 and the handle 30.

Alternatively, the motor housing 22 (more specifically, the tubular portion 23) and the handle 30 (more specifically, the tubular portion 32) can be modified into any form at least partially having such a shape that the radial distance between the motor housing 22 (the tubular portion 23) and the handle 30 (the tubular portion 32) is shorter when the handle 30 is located at the initial position than when the handle 30 is located at a relative position in front of the initial position. Such a modification also allows the radial distance between the motor housing 22 and the handle 30 to be relatively shortened in the state that the tool accessory 11 is not pressed against the workpiece. Therefore, when the user holds the rotary hammer 10 in his/her hand in this state, the radial rattling between the handle 30 and the main body housing 20 is relatively reduced, and the feeling of use of the rotary hammer 10 is improved.

Alternatively, the numbers of the guide members 70 and the elastic members 71 can be set to any numbers. For example, the guide members 70 and the elastic members 71 may be disposed at three positions distributed along the circumferential direction similarly to the biasing springs 16.

In the above-described embodiment, the relative movement between the main body housing 20 and the handle 30 and the above-described vibration-isolating structure are realized by disposing the guide members 70, the first front-side abutment portions 231, the first rear-side abutment portions 232, the front-side stopper portions 233, and the rear-side stopper portions 234 at the motor housing 22. However, these components can be disposed at any portions of the main body housing according to the layout of the rotary hammer (for example, the layout of components corresponding to the driving mechanism 50 and the motor 60). For example, these components may be disposed at the housing containing the driving mechanism or the housing containing the driving mechanism and the motor instead of the motor housing 22 containing the motor 60.

In the above-described embodiment, the rotary hammer 10 capable of performing the hammering operation and the drilling operation has been cited as one example of the power tool having a hammer mechanism. However, the power tool may be an electric hammer capable of performing only the hammering operation.

DESCRIPTION OF THE REFERENCE NUMERALS

10 rotary hammer, 11 tool accessory, 12 mode switching dial, 13 power source cable, 14 trigger, 15 switch, 16 biasing spring, 20 main body housing, 21 gear housing, 22 motor housing, 23 tubular portion, 24 bearing holding portion, 25 bellows, 30 handle, 31 grip portion, 32 tubular portion, 40 spindle, 41 tool holder, 42 cylinder, 43 driven gear, 50 driving mechanism, 51 hammer mechanism, 52 motion conversion member, 53 arm portion, 54 piston, 55 striker, 56 impact bolt, 57 intermediate shaft, 58 gear, 59 driving gear, 60 motor, 61 motor main body portion, 62 motor shaft, 63 pinion gear, 70 guide member, 71 elastic member, 91 to 94 quadrant, 231 first front-side abutment portion, 232 first rear-side abutment portion, 233 front-side stopper portion, 234 fear-side stopper portion, 321 second front-side abutment portion, 322 second rear-side abutment portion, 323 front-side recessed portion, 324 rear-side recessed portion, 325 sliding flat surface, AX1 driving axis, AX2 rotational axis

The invention claimed is:

1. A power tool having a hammer mechanism, the power tool comprising:

a final output shaft configured to removably hold a tool accessory, and defining a driving axis of the tool accessory;

a motor;

a driving mechanism configured to perform at least a hammering operation of linearly driving the tool accessory along the driving axis using power of the motor;

a housing;

a handle configured to be movable relative to the housing in an axial direction of the driving axis;

a biasing member configured to bias the handle away from the final output shaft in the axial direction; and at least one guide member disposed between the housing and the handle so as to extend in the axial direction, and configured to slidably guide relative movement between the handle and the housing, wherein the housing and the handle at least partially have such a shape that a radial distance between the housing and the handle is shorter when the handle is located at a first relative position maximally separated from the housing in the axial direction than when the handle is located at a second relative position close to the housing in the axial direction.

2. The power tool according to claim 1, wherein the motor has a rotational axis extending in parallel to the driving axis, the housing contains the motor, the handle is disposed outside the housing in a radial direction with respect to the rotational axis, and includes a first portion extending in the axial direction of the rotational axis and a second portion extending in a direction intersecting with the first portion so as to allow a user to grip the second portion, and the at least one guide member is disposed between the housing and the first portion.

3. The power tool according to claim 1, further comprising at least one elastic member disposed adjacent to the at least one guide member and between the at least one guide member and the housing or between the at least one guide member and the handle.

4. The power tool according to claim 1, wherein the housing includes at least one first abutment portion, and the handle includes at least one second abutment portion which is in abutment with the at least one first abutment portion in such a manner that a clearance in the radial direction is zero when the handle is located at the first relative position, and is out of abutment with the first abutment portion when the handle is located at the second relative position.

5. The power tool according to claim 4, wherein the at least one first abutment portion includes at least one first tapered surface that extends so as to be located at a further inner position in the radial direction toward the final output shaft, and the at least one second abutment portion includes at least one second tapered surface that extends so as to be located at a further inner position in the radial direction toward the final output shaft, the at least one second tapered surface being planarly contactable with the at least one first tapered surface.

6. The power tool according to claim 4, wherein the at least one first abutment portion includes at least one first front-side abutment portion, and at least one first rear-side abutment portion spaced apart from the at least first front-side abutment portion in the axial direction and disposed at a position farther away from the final output shaft than the at least one first front-side abutment portion, and the at least one second abutment portion includes at least one second front-side abutment portion configured to be in abutment with the at least one first front-side abutment portion, and at least one second rear-side abutment portion spaced apart from the at least one second front-side abutment portion in the axial direction and configured to be in abutment with the first rear-side abutment portion.

7. The power tool according to claim 6, wherein a separation distance between the at least one second front-side abutment portion and the at least one second rear-side abutment portion is equal to or longer than one-third of a distance by which the guide member extends in a longitudinal direction of the guide member.

8. The power tool according to claim 6, wherein the at least one first abutment portion includes at least one first tapered surface that extends so as to be located at a further inner position in the radial direction toward the final output shaft, the at least one second abutment portion includes at least one second tapered surface that extends so as to be located at a further inner position in the radial direction toward the final output shaft, the at least one second tapered surface being planarly contactable with the at least one first tapered surface, the housing includes at least one rear-side stopper portion continuous to an edge portion of the at least one first tapered surface of the at least one first rear-side abutment portion on an opposite side from the final output shaft, and the at least one rear-side stopper portion is configured to contact the handle to restrict a relative displacement between the handle and the housing in the radial direction when the handle is located at the second relative position and the handle is displaced relative to the housing in the radial direction by a predetermined amount.

9. The power tool according to claim 6, wherein the at least one first abutment portion includes at least one first tapered surface that extends so as to be located at a further inner position in the radial direction toward the final output shaft, the at least one second abutment portion includes at least one second tapered surface that extends so as to be located at a further inner position in the radial direction toward the final output shaft, the at least one second tapered surface being planarly contactable with the at least one first tapered surface, the housing includes at least one front-side stopper portion continuous to an edge portion of the at least one first tapered surface of the at least one first front-side abutment portion on a closer side to the final output shaft, and the at least one front-side stopper portion is configured to contact the handle to restrict a relative displacement between the handle and the housing in the radial direction when the handle is located at the second relative position and the handle is displaced relative to the housing in the radial direction by a predetermined amount.

10. The power tool according to claim 6, wherein the at least one first abutment portion includes at least one first tapered surface that extends so as to be located at a further inner position in the radial direction toward the final output shaft, the at least one second abutment portion includes at least one second tapered surface that extends so as to be located at a further inner position in the radial direction toward the final output shaft, the at least one second tapered surface being planarly contactable with the at least one first tapered surface, the housing includes:

at least one rear-side stopper portion continuous to an edge portion of the at least one first tapered surface of the at least one first rear-side abutment portion on an opposite side from the final output shaft; and at least one front-side stopper portion continuous to an edge portion of the at least one first tapered surface of the at least one first front-side abutment portion on a closer side to the final output shaft, the at least one rear-side stopper portion is configured to contact the handle to restrict a relative displacement between the handle and the housing in the radial direction when the handle is located at the second relative position and the handle is displaced relative to the housing in the radial direction by a predetermined amount, and the at least one front-side stopper portion is configured to contact the handle to restrict a relative displacement between the handle and the housing in the radial direction when the handle is located at the second relative position and the handle is displaced relative to the housing in the radial direction by a predetermined amount.

11. The power tool according to claim 4, wherein the at least one first abutment portion includes at least three first abutment portions circumferentially spaced apart from each other.

12. The power tool according to claim 4, wherein the motor has a rotational axis extending in parallel to the driving axis, the housing contains the motor, the handle is disposed outside the housing in a radial direction with respect to the rotational axis, and includes a first portion extending in the axial direction of the rotational axis and a second portion extending in a direction intersecting with the first portion so as to allow a user to grip the second portion, the at least one guide member is disposed between the housing and the first portion, when a front-rear direction is defined to be a direction in which the driving axis extends, an up-down direction is defined to be a direction orthogonal to the front-rear direction and generally coinciding with a direction in which the second portion of the handle extends, and a left-right direction is defined to be a direction orthogonal to the front-rear direction and the up-down direction, the at least one guide member and the at least one first abutment portion include four sets of guide members and first abutment portions respectively disposed in four quadrants defined based on the up-down direction and the left-right direction with an origin placed at the rotational axis.

13. The power tool according to claim 12, wherein the four sets of the guide members and the first abutment portions are arranged in such a manner that a circumferential distance between the guide member and the first abutment portion adjacent to each other is shorter than a circumferential distance between the two guide members adjacent to each other.

14. The power tool according to claim 4, wherein the at least one first abutment portion includes at least one first tapered surface that extends so as to be located at a further inner position in the radial direction toward the final output shaft, the at least one second abutment portion includes at least one second tapered surface that extends so as to be located at a further inner position in the radial direction toward the final output shaft, the at least one second tapered surface being planarly contactable with the at least one first tapered surface, the at least one first abutment portion includes at least one first front-side abutment portion, and at least one first rear-side abutment portion spaced apart from the at least first front-side abutment portion in the axial direction and disposed at a position farther away from the final output shaft than the at least one first front-side abutment portion, and the at least one second abutment portion includes at least one second front-side abutment portion configured to be in abutment with the at least one first front-side abutment portion, and at least one second rear-side abutment portion spaced apart from the at least one second front-side abutment portion in the axial direction and configured to be in abutment with the first rear-side abutment portion.

15. The power tool according to claim 4, wherein the at least one first abutment portion includes at least one first tapered surface that extends so as to be located at a further inner position in the radial direction toward the final output shaft, the at least one second abutment portion includes at least one second tapered surface that extends so as to be located at a further inner position in the radial direction toward the final output shaft, the at least one second tapered surface being planarly contactable with the at least one first tapered surface, and the at least one first abutment portion includes at least three first abutment portions circumferentially spaced apart from each other.

16. The power tool according to claim 4, wherein the at least one first abutment portion includes at least one first tapered surface that extends so as to be located at a further inner position in the radial direction toward the final output shaft, the at least one second abutment portion includes at least one second tapered surface that extends so as to be located at a further inner position in the radial direction toward the final output shaft, the at least one second tapered surface being planarly contactable with the at least one first tapered surface, the at least one first abutment portion includes at least one first front-side abutment portion, and at least one first rear-side abutment portion spaced apart from the at least first front-side abutment portion in the axial direction and disposed at a position farther away from the final output shaft than the at least one first front-side abutment portion, the at least one second abutment portion includes at least one second front-side abutment portion configured to be in abutment with the at least one first front-side abutment portion, and at least one second rear-side abutment portion spaced apart from the at least one second front-side abutment portion in the axial direction and configured to be in abutment with the first rear-side abutment portion, and the at least one first abutment portion includes at least three first abutment portions circumferentially spaced apart from each other.

* * * * *